United States Patent
Russ et al.

(10) Patent No.: US 10,839,636 B2
(45) Date of Patent: Nov. 17, 2020

(54) PROGRAMMABLE HAPTIC FORCE FEEDBACK SENSATIONS IN ELECTRONIC WAGERING GAMES

(71) Applicant: IGT, Las Vegas, NV (US)

(72) Inventors: Michael Russ, Graz (AT); Stefan Keilwert, St. Josef (AT); Sven Aurich, Schwanberg (AT); Lukas Angermayer, Graz (AT); Klaus Hufnagl-Abraham, Graz (AT)

(73) Assignee: IGT, Las Vegas, NV (US)

(*) Notice: Subject to any disclaimer, the term of this patent is extended or adjusted under 35 U.S.C. 154(b) by 8 days.

(21) Appl. No.: 16/247,992

(22) Filed: Jan. 15, 2019

(65) Prior Publication Data

US 2020/0226872 A1 Jul. 16, 2020

(51) Int. Cl.
*G07F 17/32* (2006.01)
*G06F 3/02* (2006.01)
*F16F 9/53* (2006.01)
*G06F 3/01* (2006.01)

(52) U.S. Cl.
CPC .......... *G07F 17/3209* (2013.01); *F16F 9/535* (2013.01); *G06F 3/016* (2013.01); *G06F 3/0205* (2013.01)

(58) Field of Classification Search
None
See application file for complete search history.

(56) References Cited

U.S. PATENT DOCUMENTS

| 6,339,419 B1 * | 1/2002 | Jolly ........ G06F 3/011 244/223 |
| 7,113,166 B1 * | 9/2006 | Rosenberg ...... A63B 21/0057 345/156 |
| 7,432,910 B2 | 10/2008 | Shahoian |
| 7,446,752 B2 | 11/2008 | Goldenberg et al. |
| 7,982,720 B2 | 7/2011 | Rosenberg et al. |
| 2008/0132313 A1 * | 6/2008 | Rasmussen ......... G07F 17/32 463/16 |

(Continued)

FOREIGN PATENT DOCUMENTS

EP 1226852 B1 6/2007

*Primary Examiner* — James S. McClellan
*Assistant Examiner* — Peter J Iannuzzi
(74) *Attorney, Agent, or Firm* — Sage Patent Group

(57) ABSTRACT

An electronic gaming machine (EGM) includes a programmable haptic interface that produces, responsive to a force feedback signal, a variable amount of resistance to movement of a moveable element of the programmable haptic interface by a player as a haptic force feedback. A memory is coupled to a processor circuit and includes machine-readable instructions that cause the processor circuit to initiate a wagering game on the EGM. The processor circuit further generates the force feedback signal controlling an amount of resistance to movement of the moveable element of the programmable haptic interface based on a game event in the sequence of game events. The programmable haptic interface includes a magnetorheological fluid coupling the moveable element to a fixed housing that is mounted to the EGM and a circuit controlling a magnitude of a magnetic field that is applied across the magnetorheological fluid responsive to the force feedback signal.

17 Claims, 16 Drawing Sheets

(56) References Cited

U.S. PATENT DOCUMENTS

2010/0160016 A1* 6/2010 Shimabukuro ..... G07F 17/3209
463/16
2017/0361217 A1* 12/2017 Burdea ................... A63F 13/06
2018/0082545 A1* 3/2018 Winters .............. G07F 17/3244

* cited by examiner

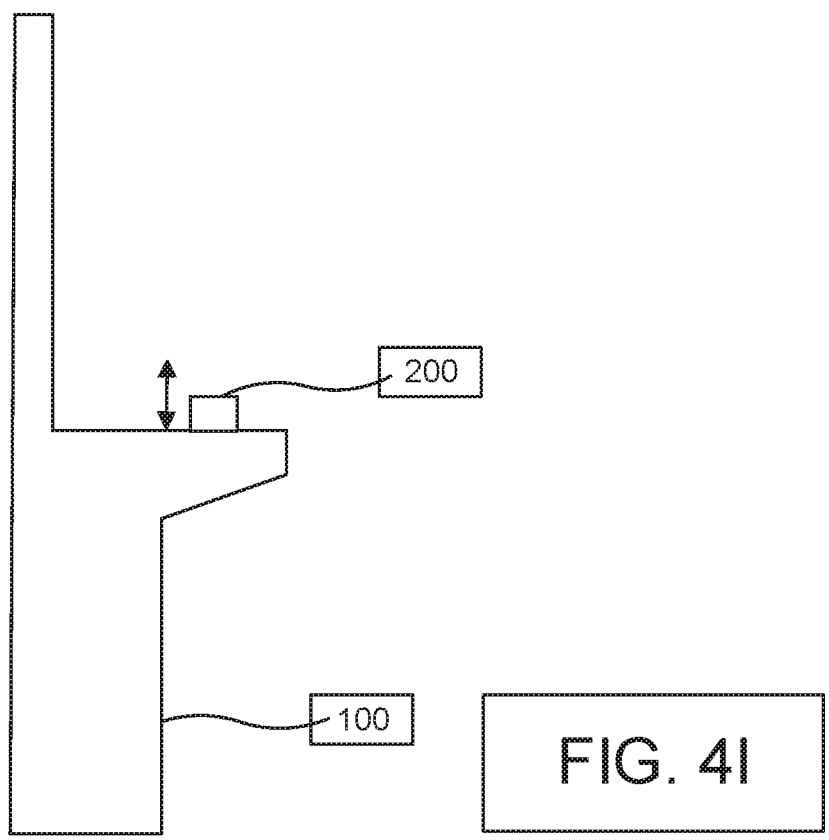

PROGRAMMABLE HAPTIC FORCE FEEDBACK SENSATIONS IN ELECTRONIC WAGERING GAMES

BACKGROUND OF THE DISCLOSURE

The disclosure relates to systems and methods for providing wagering games on electronic gaming machines. In particular, systems and methods are provided for providing programmable haptic force feedback sensations in electronic gaming machines.

Electronic and electro-mechanical gaming machines (EGMs) are systems that allow players to place a wager on the outcome of a random event, such as the spinning of mechanical or virtual reels or wheels, the playing of virtual cards, the rolling of mechanical or virtual dice, the random placement of tiles on a screen, etc. Conventional EGMs may include human-machine interfaces (HMI) that provide not haptic feedback or static haptic feedback to a player. For example, touch screens may generally provide no haptic feedback as a player may only receive optical feedback confirming the receipt of the input. Haptic controllers, such as conventional buttons or rotary knobs may provide static feedback, such as a click feedback when pushing or rotating. However, such feedback may be static and thus players may not know if the correct feedback was received in the absence of an additional optical feedback.

BRIEF SUMMARY OF THE DISCLOSURE

An electronic gaming machine (EGM) according to some embodiments includes a programmable haptic interface that produces, responsive to a force feedback signal, a variable amount of resistance to movement of a moveable element of the programmable haptic interface by a player as a haptic force feedback, a processor circuit, and a memory coupled to the processor circuit. The memory includes machine-readable instructions that, when executed by the processor circuit cause the processor circuit to initiate a wagering game on the EGM, wherein the wagering game operates according to a set of game rules that include game flow rules that define a sequence of game events that are presented to the player in a course of operation of the wagering game. The processor circuit may further generate the force feedback signal controlling an amount of resistance to movement of the moveable element of the programmable haptic interface based on a game event in the sequence of game events. The programmable haptic interface includes a magnetorheological fluid coupling the moveable element to a fixed housing that is mounted to the EGM and a circuit controlling a magnitude of a magnetic field that is applied across the magnetorheological fluid responsive to the force feedback signal.

A method according to some embodiments includes initiating, by a processor circuit of an electronic gaming machine (EGM), a wagering game on the EGM, wherein the wagering game operates according to a set of game rules including game flow rules that define multiple game events that are presented to a player in a course of operation of the wagering game. The method further includes receiving, into the processor circuit, interface data that is generated by a programmable haptic interface and that is a measurement of movement of a rotary element in the programmable haptic interface, generating, by the processor circuit, a force feedback signal that is based on one of the game events and the interface data; and transmitting, by the processor circuit, the force feedback signal to the programmable haptic interface to cause the programmable haptic interface to generate a variable resistance to movement of the moveable element to a manual activation by the player by modulating a magnetic field applied to a magnetorheological fluid in the programmable haptic interface.

An EGM according to some embodiments includes a programmable haptic interface to receive player input from a player, to receive a force feedback signal, and to generate a haptic force feedback that includes variable resistance to movement to the player based on the player input. The EGM includes a processor circuit and a memory coupled to the processor circuit, the memory comprising machine-readable instructions that, when executed by the processor circuit cause the processor circuit to initiate a wagering game on the EGM. The wagering game operates according to a set of game rules comprising game flow rules that define a sequence of game events that are presented to a player in a course of operation of the wagering game. The processor circuit is further configured to receive interface data that is generated by the programmable haptic interface and that is a measurement of movement of a rotary element in the programmable haptic interface, generate the force feedback signal to be used by the programmable haptic interface to determine the haptic force feedback sensation to the player that is based on one of the plurality of game events and the interface data and transmit the force feedback signal to the programmable haptic interface to cause the programmable haptic interface to generate a variable resistance to movement of a moveable element to a manual activation by the player by modulating a magnetic field applied to a magnetorheological fluid in the programmable haptic interface.

BRIEF DESCRIPTION OF SEVERAL VIEWS OF THE DRAWINGS

Certain embodiments of the inventive concepts are illustrated in the figures of the accompanying drawings in which:

FIGS. 4A-4I are schematic block diagrams illustrating different respective EGM integrations including a programmable haptic interface according to certain embodiments of the inventive concepts.

DETAILED DESCRIPTION OF THE DISCLOSURE

Figure 1:
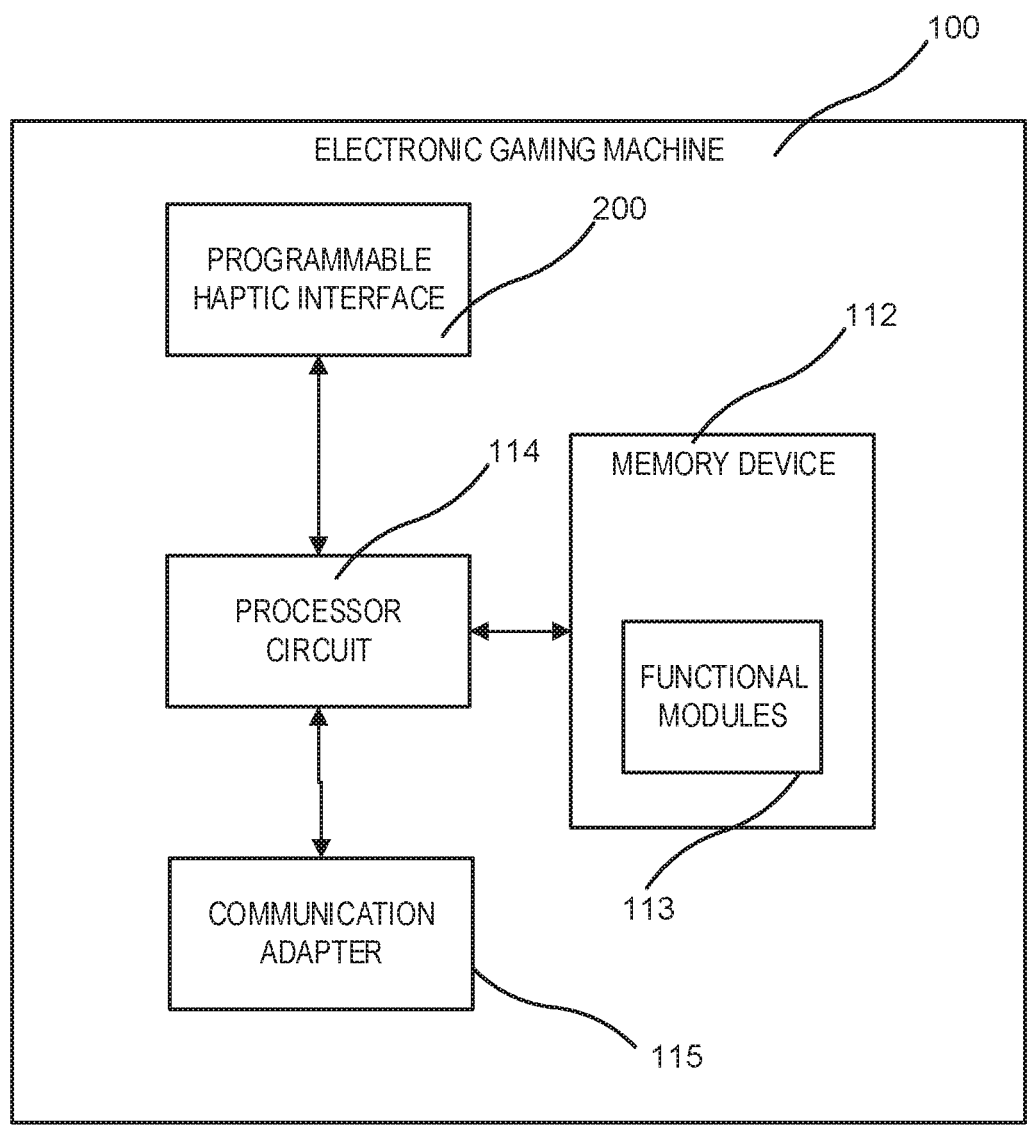
FIG. 1 is a schematic block diagram depicting an electronic gaming machine according to some embodiments of the inventive concepts.

For simplicity and illustrative purposes, the principles of the present inventive concepts are described by referring mainly to various example embodiments thereof. Although the preferred embodiments of the inventive concepts are particularly disclosed herein, one of ordinary skill in the art will readily recognize that the same principles are equally applicable to, and can be implemented in other systems, and that any such variation would be within such modifications that do not part from the true spirit and scope of the present inventive concepts. Before explaining the disclosed embodiments of the present inventive concepts in detail, it is to be understood that the inventive concepts is are not limited in its application to the details of any particular arrangement shown, since the inventive concepts is capable of other embodiments. Throughout this description, certain acronyms and shorthand notations are used. These acronyms and shorthand notations are intended to assist in communicating the ideas expressed herein and are not intended to limit the scope of the present inventive concepts. Other terminology used herein is for the purpose of description and not of limitation.

According to some inventive concepts herein, a human-machine interface (HMI) controller may provide a player with programmable haptic force feedback sensations using a resistive force. The generated programmable feedback may be changed over time based on the content and/or an input at the EGM. In some embodiments, the player may receive a force feedback in real-time directly from the resistance that is generated in the HMI controller. In this manner, the player may receive feedback in the absence of optical feedback. Some embodiments further provide that additional optical feedback may be provided to increase the perceived force feedback sensations for the player. In this way, these and other embodiments provide a technical solution to the uniquely challenging technical problem increasing the interest and enjoyment of playing a gaming device at a gaming or other establishment.

As provided herein, the controller may include a programmable haptic interface. The programmable haptic interface may include a moveable element that is moveable relative to a fixed element. A magnetorheological fluid may provide a variable resistance to movement of the moveable element relative to the fixed element. The variable resistance may be controlled by varying a magnitude of a magnetic field that is applied across the magnetorheological fluid using a control circuit.

In some embodiments, the moveable element of the programmable haptic interface includes a magneto-textural inertial spinning system (MATISS) controller that may be highly dynamic and may provide positive and negative resistive force. For example, the moveable element of the programmable haptic interface may include a rotary knob that may be programmable to provide a dynamic force feedback to enhance immersive sensations for a player.

Reference is now made to FIG. 1, is a schematic block diagram depicting an electronic gaming machine according to some embodiments of the inventive concepts. According to embodiments herein, an electronic gaming machine (EGM) 100 may include a programmable haptic interface 200 that produces a variable amount of resistance to movement by a player of a moveable element thereof in response to a force feedback signal. The resistance to movement of the moveable element may provide a haptic force feedback that may be sensed by the player. The EGM 100 further includes a processor circuit 114 and a memory 112 that is coupled to the processor circuit 114 and that includes machine-readable instructions that, when executed by the processor circuit 114, cause the processor circuit to perform operations including initiating a wagering game on the EGM 100. The wagering game may operate according to a set of game rules that include game flow rules that define a sequence of game events that are presented to the player in a course of operation of the wagering game.

Additionally, the processor circuit 114 may generate the force feedback signal that controls an amount of resistance to movement of the moveable element of the programmable haptic interface 200 based on a game event in the sequence of game events. The force feedback signal that is generated by the processor circuit may be transmitted to the programmable haptic interface 200. As discussed below, some embodiments of the programmable haptic interface 200 may include a magnetorheological fluid that couples the moveable element to a fixed housing that is mounted to the EGM and a circuit controlling a magnitude of a magnetic field that is applied across the magnetorheological fluid in response to the force feedback signal.

The processor circuit 114 may control operations of EGM 100. Although illustrated as a single processor circuit, multiple special purpose and/or general purpose processor circuits and/or processor circuit cores may be provided in the EGM 100. For example, the EGM 100 may include one or more of a video processor, a signal processor, a sound processor and/or a communication controller that performs one or more control functions within the EGM 100. The processor circuit 114 may be variously referred to as a "controller," "microcontroller," "microprocessor" or simply a "computer." The processor circuit 114 may further include one or more application-specific integrated circuits (ASICs).

Various components of the EGM 100 are illustrated as being connected to the processor circuit 114. It will be appreciated that the components may be connected to the processor circuit 114 through a system bus, a communication bus and controller, such as a USB controller and USB bus, a network interface, or any other suitable type of connection.

The EGM 100 further includes a memory device 112 that stores one or more functional modules 113 for performing the operations described herein.

The memory device 112 may store program code and instructions, executable by the processor circuit 114, to control the EGM 100 including the programmable haptic interface 200. The memory device 112 may include random access memory (RAM), which can include non-volatile RAM (NVRAM), magnetic RAM (ARAM), ferroelectric RAM (FeRAM) and other forms as commonly understood in the gaming industry. In some embodiments, the memory device 112 may include read only memory (ROM). In some embodiments, the memory device 112 may include flash memory and/or EEPROM (electrically erasable programmable read only memory). Any other suitable magnetic, optical and/or semiconductor memory may operate in conjunction with the gaming device disclosed herein.

The game modification server 16 may include a communication adapter 115 including transceiver circuitry that enables the EGM 100 to communicate with remote devices, such as servers and other EGMs over a wired and/or wireless communication network, such as a local area network (LAN), wide area network (WAN), cellular communication network, or other data communication network.

The EGM 100 may include one or more internal or external communication ports that enable the processor circuit 114 to communicate with and to operate with internal or external peripheral devices, such as display screens, keypads, mass storage devices, microphones, speakers, and wireless communication devices. In some embodiments, internal or external peripheral devices may communicate with the processor circuit 114 through a universal serial bus (USB) hub (not shown) connected to the processor circuit 114.

Figure 2A:
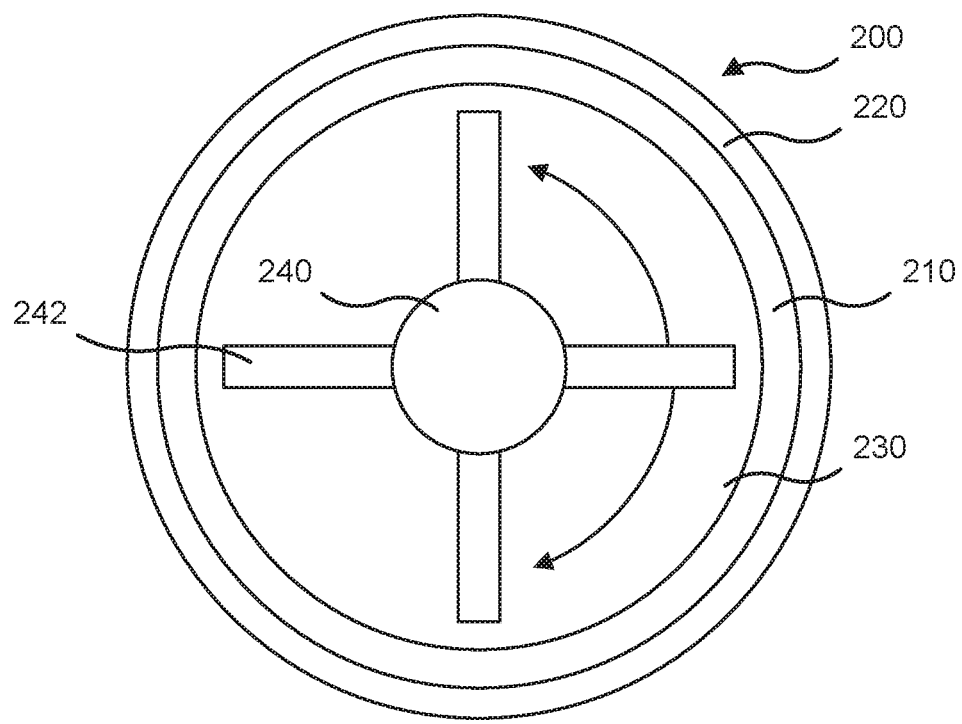
FIGS. 2A and 2B are schematic block diagrams illustrating cut-away top and side views of a programmable haptic interface according to certain embodiments of the inventive concepts.
Figure 2B:
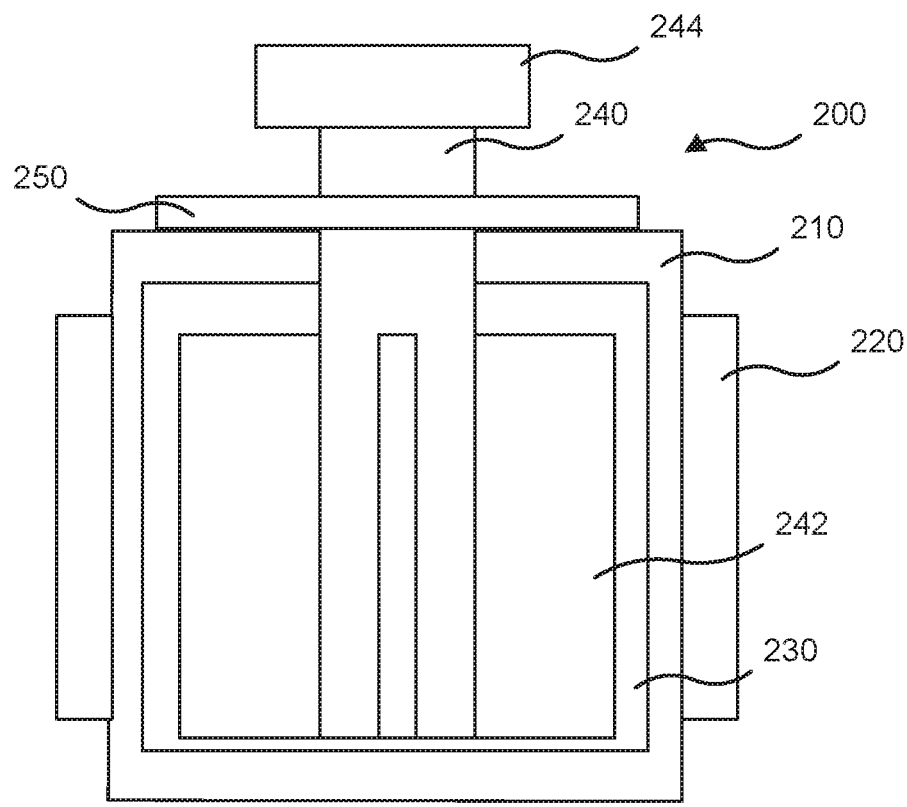

For example, reference is now made to FIGS. 2A and 2B are schematic block diagrams illustrating cross-sectional top and side views of a programmable haptic interface according to certain embodiments of the inventive concepts. The programmable haptic interface 200 illustrated in FIGS. 2A and 2B depict a rotary programmable haptic interface 200 may include a moveable element 240 that may exhibit a variable resistance to rotary motion relative to the fixed housing 210. A magnetorheological fluid 230 may provide a coupling between the moveable element 240 and the fixed housing 210. The moveable element 240 may include resistance vanes 242 that are configured to move through the magnetorheological fluid 230 as the moveable element is rotated, for example, by the player. The viscosity of the magnetorheological fluid may determine the amount of resistance to movement the moveable element 240 experiences.

For example, programmable haptic interface 200 may include a rotary knob 244 that may be rotated by the player. In some embodiments, the force feedback signal is generated based on the game event and a measurement of a rotary position of the rotary knob 244. The force feedback signal may be generated to control an amount of resistance to movement of the rotary knob 244 based on a combination of the game event and an amount of change in the rotary position of the rotary knob 244.

The rotary position, speed and/or direction of the moveable element 240 may be determined using a moveable element encoder 250 that measures movement responsive to manual activation of the moveable element 240 and generates interface movement data that is used by the processor circuit (FIG. 1, 114) to generate the force feedback signal. In some embodiments, the moveable element encoder 250 may include a digital and/or analog encoder.

The programmable haptic interface 200 may include a circuit 220 that controls a magnitude and/or direction of a magnetic field that is applied across the magnetorheological fluid 230 in response to receiving the force feedback signal that is generated by the processor circuit. The circuit 220 may include one or more conductive coils that may be selectively driven by a control current. The direction and magnitude of the magnetic field may be controlled based on the magnitude of the control current and the orientation of the conductive coils.

When the magnetorheological fluid 230 is subjected to a magnetic field, the viscosity thereof increases even to the point of becoming a viscoelastic solid. In this manner, the yield stress of the magnetorheological fluid 230 may be controlled very accurately by varying the magnetic field magnitude.

Although primarily discussed in terms of a rotary programmable haptic interface 200, linear programmable haptic interfaces are contemplated herein in applications that variable linear haptic force feedback is desirable.

Figure 3:
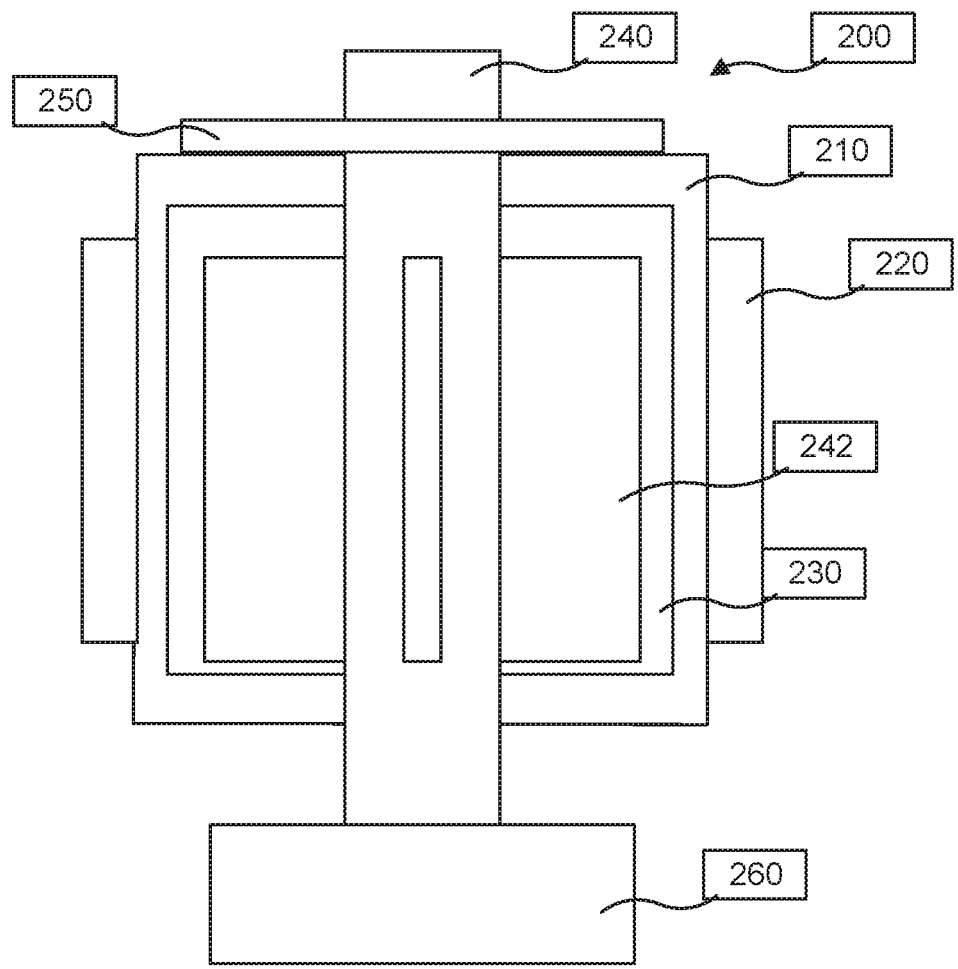
FIG. 3 is schematic block diagram illustrating cut-away side view of a programmable haptic interface including a driving motor according to certain embodiments of the inventive concepts.

In some embodiments, the conductive coils of the circuit 220 may be selectively driven to generate a negative resistance to movement, which translates as a motive input to the moveable element 240 of the programmable haptic interlayer 200. Some embodiments provide that an additional motive component may provide the negative resistance to movement. For example, brief reference is now made to FIG. 3, which is schematic block diagram illustrating cutaway side view of a programmable haptic interface including a driving motor according to certain embodiments of the inventive concepts. As illustrated, a portion of the moveable element 240 may be coupled to a motor 260 that provides movement of the moveable element 240 to generate a negative resistance to movement thereof. Some embodiments provide that the resistance to movement may be controlled from a negative resistance to a positive resistance by combined control of the motor 260 and the current through the conductive coils. For example, the motor 260 may, responsive to receiving a voltage, cause movement of the moveable element 240 to act against the resistance to rotation caused by the magnetorheological fluid 230. In this manner, the force feedback signal may be controlled to modulate resistance to movement of the moveable element 240 that is caused by the motor 260. For example, some embodiments provide that the rotary knob is self-rotating that the wagering game operates in an auto-play mode responsive to the player holding the rotary knob in a fixed position for a threshold time.

In such embodiments, the force feedback signal may be controlled to provide an increasing amount of resistance to movement of the rotary knob 240 responsive to the player holding the rotary knob 240 in a static position for an increasing time duration.

Figure 4A:
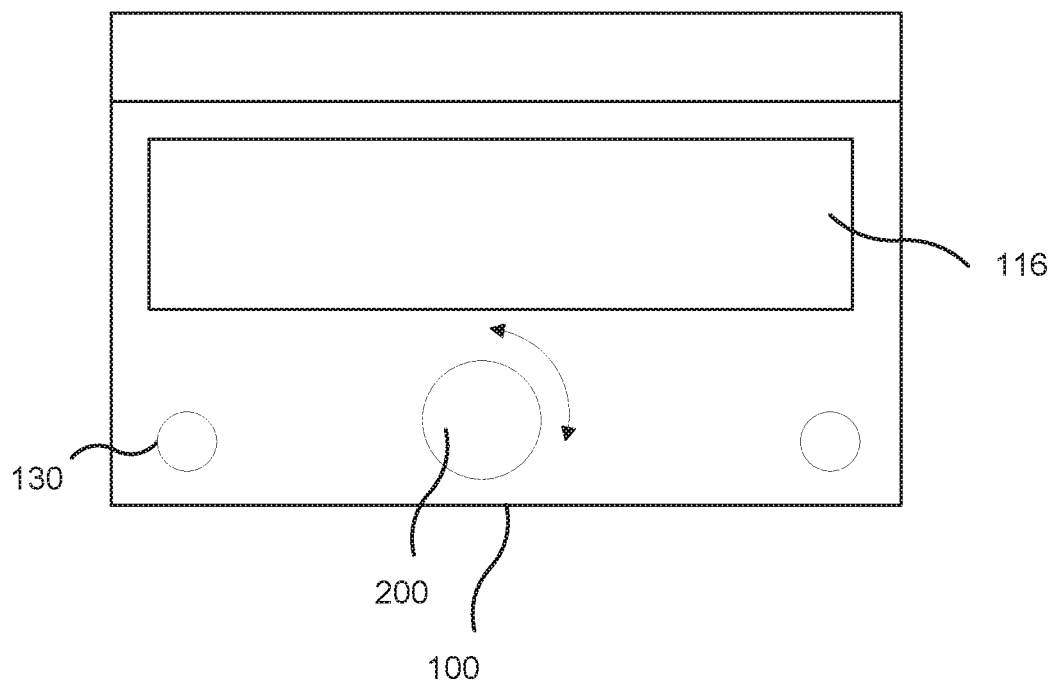

Reference is now made to FIGS. 4A-4I, which are schematic block diagrams illustrating different respective EGM integrations including a programmable haptic interface according to certain embodiments of the inventive concepts. FIGS. 4A-4D depict top views of EGM integrations and FIGS. 4E-4I depict side views of EGM integrations. Referring to FIG. 4A, an EGM 100 includes a display device 116, one or more input buttons 130 and a programmable haptic interface 200 according to some embodiments herein. In such embodiments, the programmable haptic interface 200 may provide left and/or right rotational force feedback to used based on different game events and/or conditions.

Figure 4B:
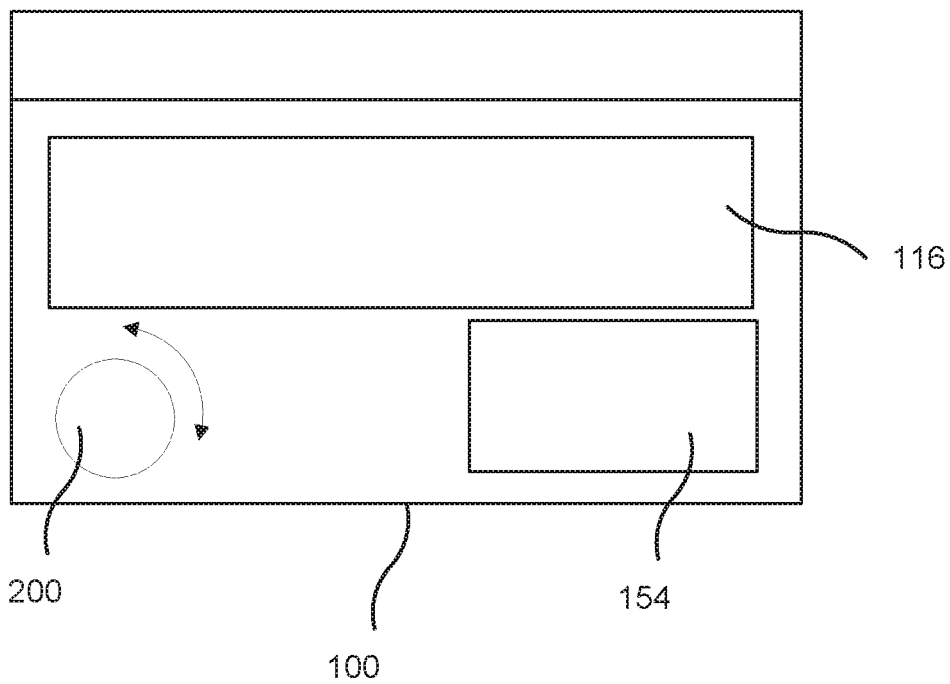

Referring to FIG. 4B, an EGM 100 includes a display device 116, a touch screen controller 154 and a programmable haptic interface 200 according to some embodiments herein. In such embodiments, the programmable haptic interface 200 may provide left and/or right rotational force feedback that may be synchronized with touch interface to provide videogame-like inputs, such as combined actions like moving and looking around as part of the game experience. In some embodiments, the programmable haptic interface 200 controls one of multiple different game functions and the touch inputs determine which function of the different functions is associated with the programmable haptic interface.

Figure 4C:
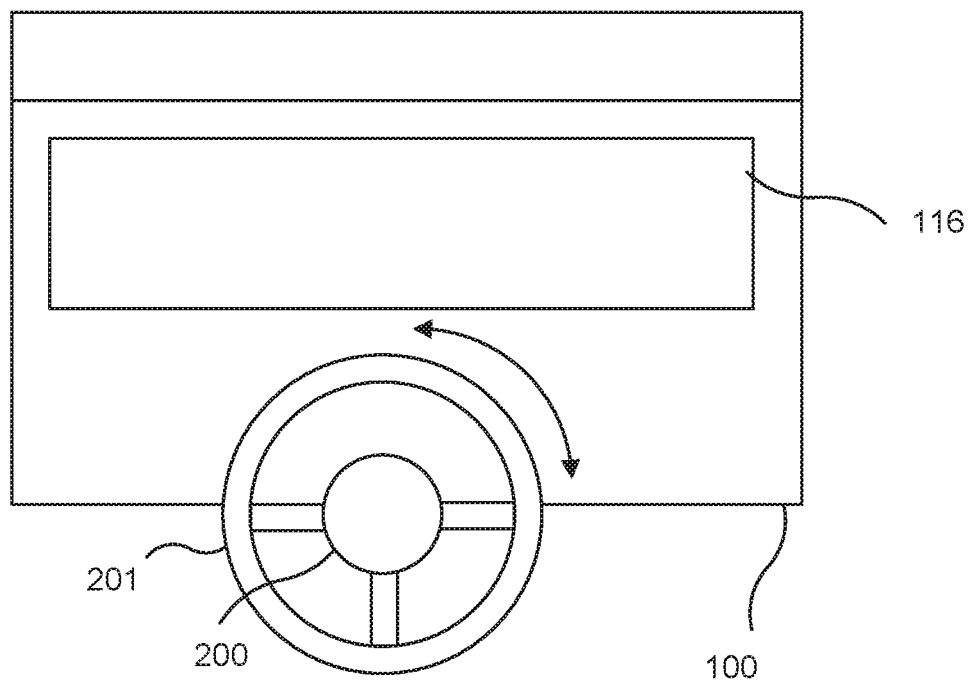

Referring to FIG. 4C, an EGM 100 includes a display device 116 and a programmable haptic interface 200 that is coupled to a vehicle steering wheel 201 according to some embodiments herein. In such embodiments, the programmable haptic interface 200 may provide left and/or right rotational force feedback that corresponds to driving and/or racing style games. In some embodiments, the force feedback may be changed to correspond to environmental conditions in the game, such as road surface conditions. For example, responsive to driving a vehicle on a normal dry street surface, the haptic force feedback may provide a higher resistance to movement than may be provided on a loose road surface, such as sand or dirt. Further, the haptic force feedback corresponding to a wet surface may provide a varying resistance to movement based on the inconsistent road condition. In some embodiments, providing the varying resistance may include generating a haptic force feedback that includes a periodic haptic force feedback component that is generated to alternate between providing a first amount of resistance to movement of the vehicle steering wheel and a second amount of resistance to movement of the vehicle steering wheel at a first frequency that corresponds to the game event.

Figure 4D:
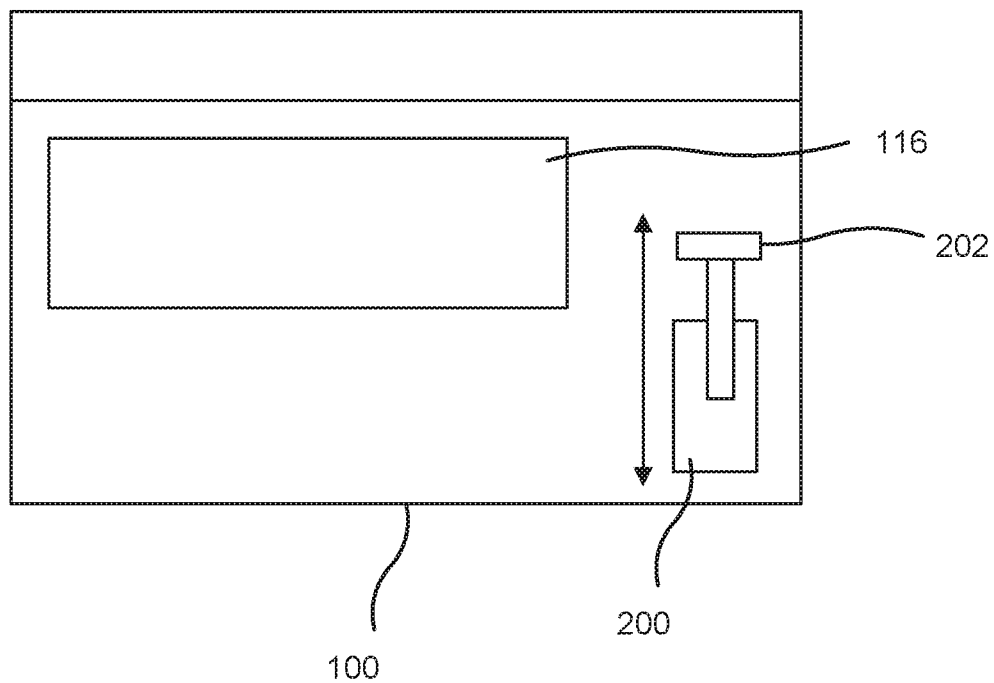

Referring to FIG. 4D, an EGM 100 includes a display device 116 and a programmable haptic interface 200 according to some embodiments herein. In such embodiments, the programmable haptic interface 200 that is coupled to a single axis control input 202. Although illustrated as being oriented in a front to back range of motion, which may correspond to a vertical-axis control input, embodiments herein further include the programmable haptic interface and the single axis control input 202 being oriented to include a left-to-right range of motion and thus correspond to a horizontal axis control input.

Figure 4E:
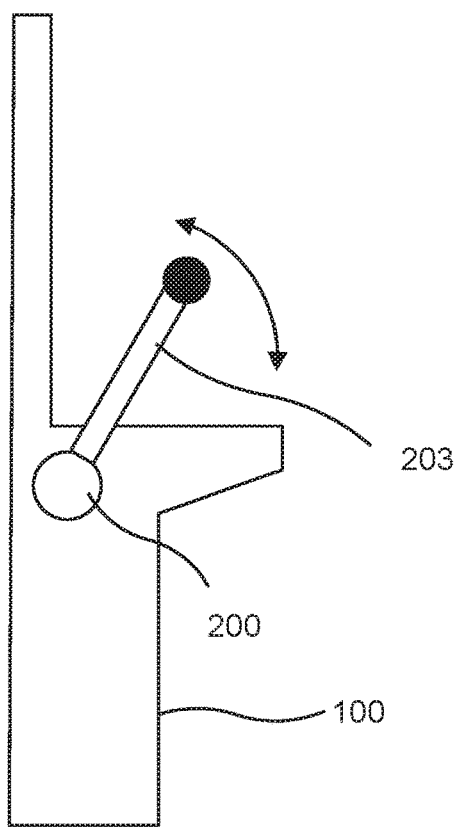

Referring to FIG. 4E, an EGM 100 includes a programmable haptic interface 200 according to some embodiments herein. In such embodiments, the programmable haptic interface 200 is coupled to a single axis control lever 203 that extends from the programmable haptic interface 200 and includes a rotational motion range about a center of rotation that corresponds to the programmable haptic interface 200. Some embodiments provide that the force feedback signal controls the amount of resistance that is delivered to the player via the single axis control lever 203. For example, varying amount of force may be required to activate a stepper for causing reels to start spinning. In some embodiments, the processor circuit (FIG. 1, 114) causes a reel speed corresponding to a displayed reel of the EGM 100 to be varied based on the movement of the single axis control lever 203 and the resistance increases responsive to the player moving the single axis controller. Some embodiments provide the single axis control lever 203 and the programmable haptic interface 200 may be defined as a single axis controller.

Figure 4F:
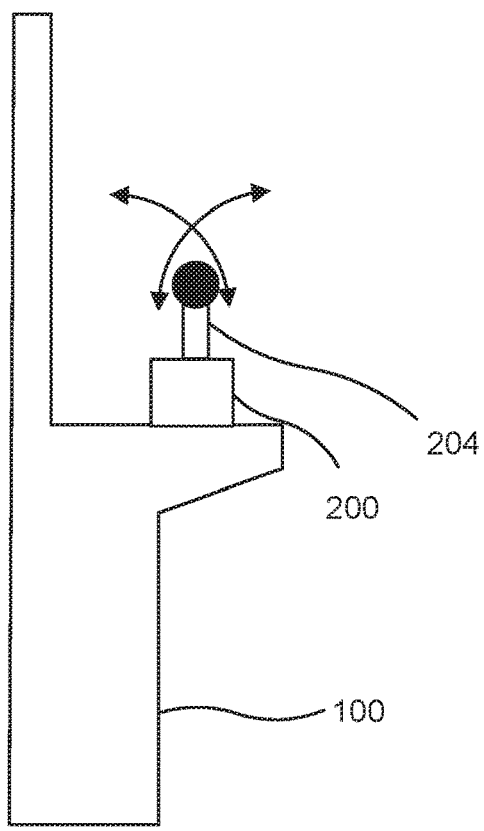

Referring to FIG. 4F, an EGM 100 includes a programmable haptic interface 200 according to some embodiments herein. In such embodiments, the programmable haptic interface 200 is part of a multi-axis controller that includes a multi-axis joystick 204 that receives player input corresponding to multiple axes of movement. The processor circuit (FIG. 1, 114) may generate one or more force feedback signals for the multiple axes of movement and send the force feedback signals to the programmable haptic interface 200. The haptic force feedback may include resistance that is delivered to the player via the joystick 204. The variable resistance may change in directions corresponding to the axes of movement responsive to a change in a property of the wagering game.

Figure 4G:
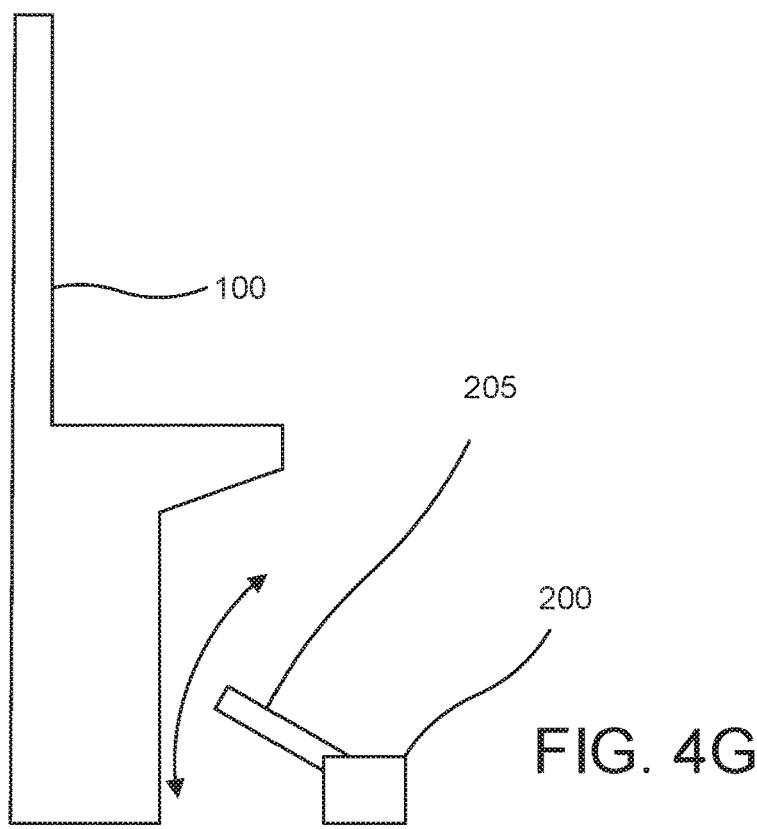

Referring to FIG. 4G, an EGM 100 includes a programmable haptic interface 200 according to some embodiments herein. In such embodiments, the programmable haptic interface 200 is coupled to a foot operated control lever 205 that extends from the programmable haptic interface 200 and includes a rotational motion range about a center of rotation that corresponds to the programmable haptic interface 200. An example of a foot operated control lever 205 may include a pedal, such as an accelerator or brake pedal. Some embodiments provide that the force feedback signal controls the amount of resistance that is delivered to the player via the foot operated control lever 205.

Figure 4H:
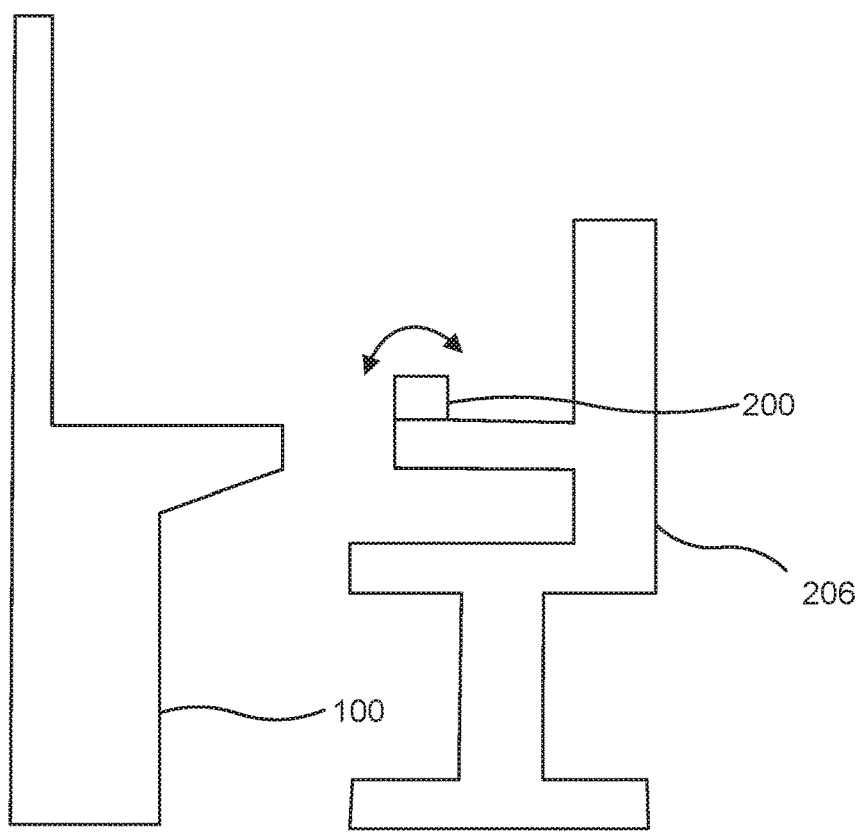

Referring to FIG. 4H, an EGM 100 includes a programmable haptic interface 200 according to some embodiments herein. In such embodiments, the programmable haptic interface 200 is mounted to a portion of a chair, such as an armrest or other comparable structure. Such mounting may provide additional comfort for a player.

Referring to FIG. 4I, an EGM 100 includes a programmable haptic interface 200 according to some embodiments herein. In such embodiments, the programmable haptic interface 200 is configured to operate linearly in a single dimension. For example, the programmable haptic interface 200 may be a push button in which the amount of force necessary to depress the button may be varied.

Although not illustrated, other control integrations may include a fishing rod in which the resistance to reeling in a fish is varied by using a programmable haptic interface in the reel. Yet further, a mechanical wheel that may be spun by a player may have a varying resistance to spinning using a programmable haptic interface. Yet further, EGMs 100 may include multiple different programmable haptic interfaces that are operable to provide haptic force feedback corresponding to various functions thereof.

Figure 5A:
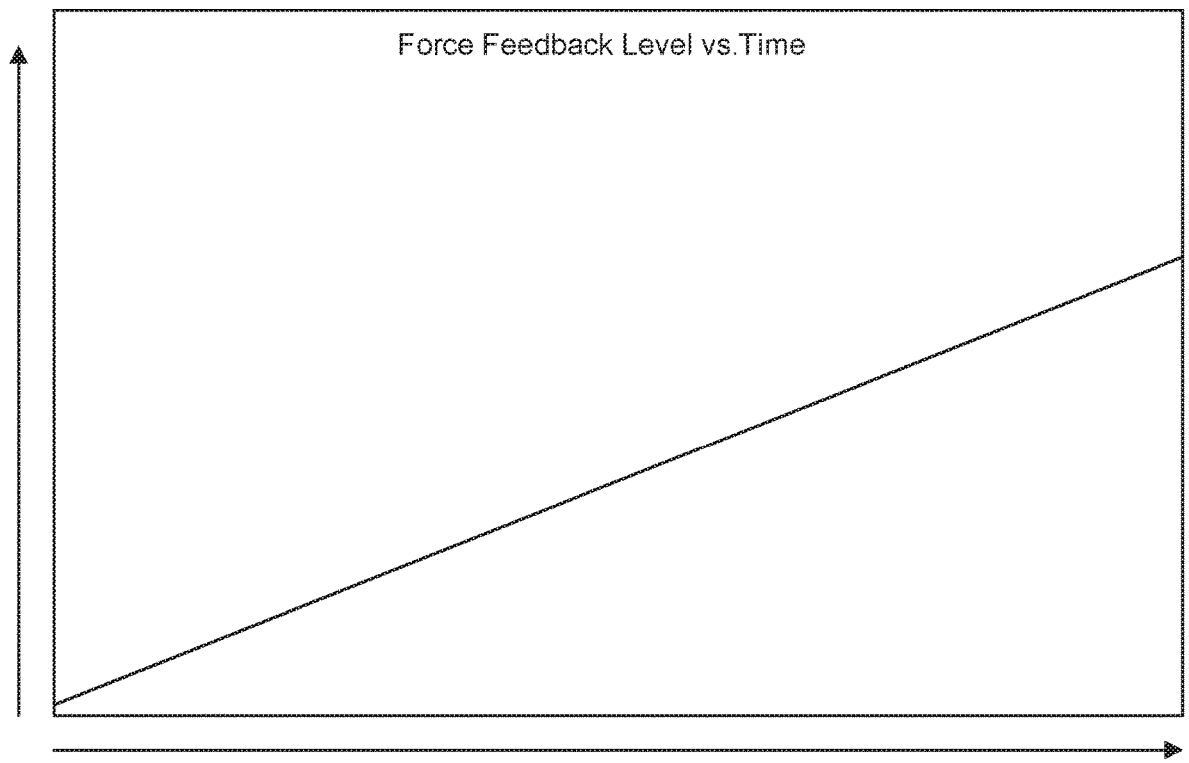
FIGS. 5A-5E are graphs plotting force feedback level performance of a programmable haptic interface according to certain embodiments of the inventive concepts.

Reference is now made to FIGS. 5A-5E, which are graphs plotting force feedback level performance of a programmable haptic interface according to certain embodiments of the inventive concepts. In all of graphs 5A-5E, the vertical axis represents the force feedback level provided by the programmable haptic interface. Referring to FIG. 5A, the force feedback level increases substantially linearly as a function of time elapsed. This may be used to provide haptic force feedback in a jump and run style game in which the player is navigating a vehicle to gather multiple objects in a path. As the player gathers more objects, the resistance increases. The haptic force feedback may be varied based on the steepness of a hill and whether or not the player is moving the vehicle up or down the hill.

Figure 5B:
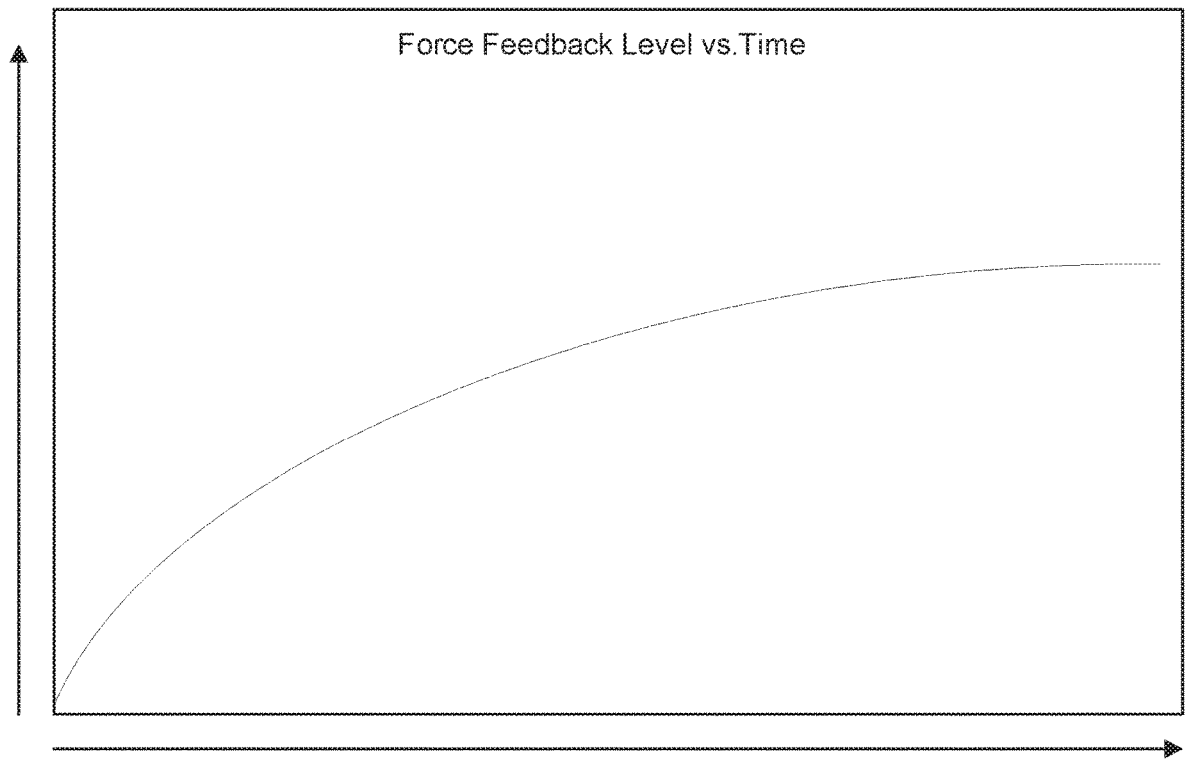

Similarly, referring to FIG. 5B, the force feedback may increase in a non-linear manner based on a condition through which the player in moving the vehicle. For example, if the vehicle is in a mud or quicksand environment, the haptic force feedback may cause the force to increase non-linearly as the vehicle sinks deeper into the mud or quicksand. In some embodiments, responsive to the vehicle being in the mud or quicksand environment for an extended period of time, the resistance may be increased to a point that the vehicle may not be able to proceed and may sink and/or become permanently immobilized.

Figure 5C:
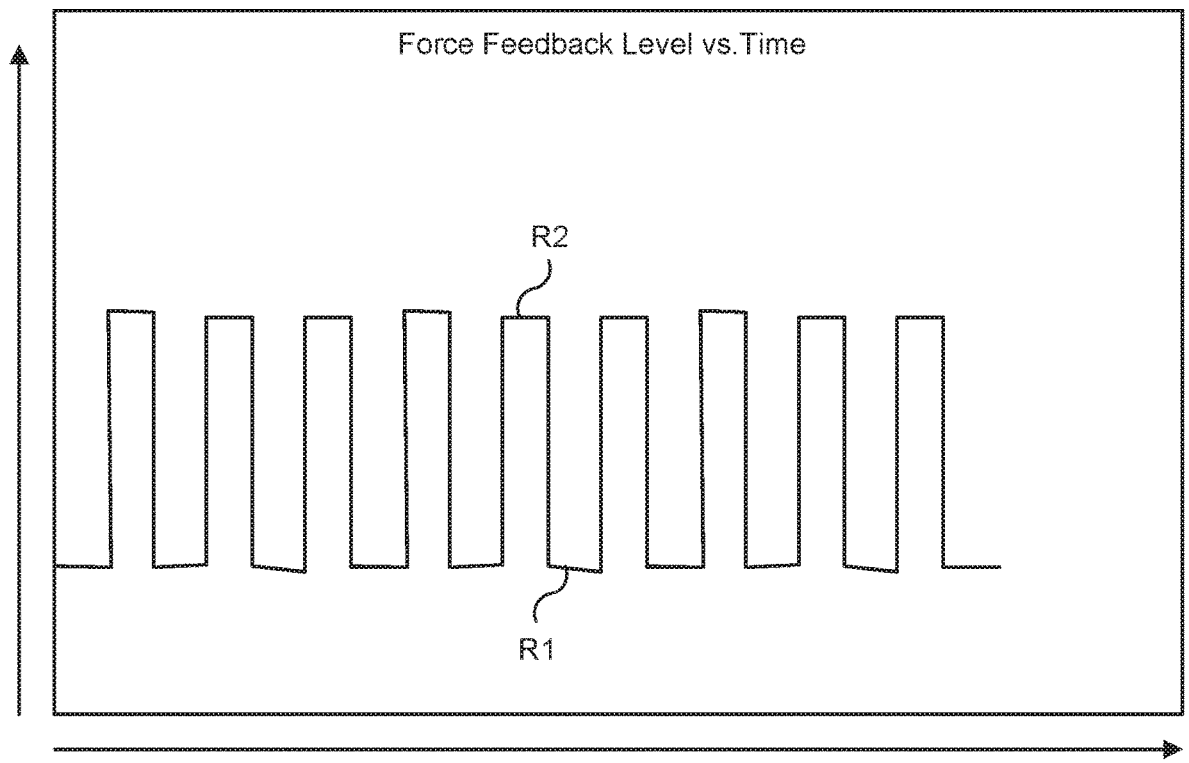

Referring to FIG. 5C, the haptic force feedback may alternate between a lower resistance R1 to a higher resistance R2 in response to the vehicle being navigated over an uneven surface, such as a log bridge or railroad tracks, among others. Similarly, the seams between road segments may be simulated using periodic changes between resistance levels. In this manner, vibration may be simulated using the haptic force feedback.

Figure 5D:
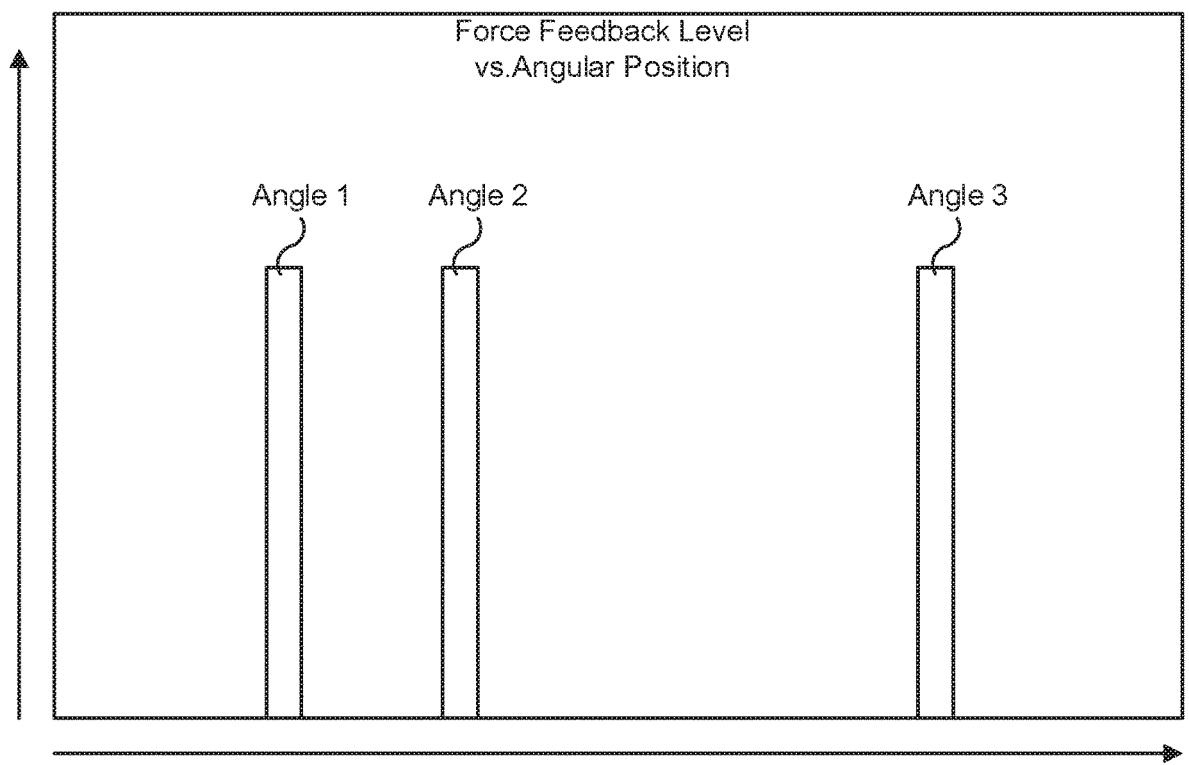

Referring to FIG. 5D, the haptic force feedback may be provided as a function of the rotary position of the player interface instead of time. For example, instances of haptic force feedback causing a higher resistance to movement of the moveable element may correspond to specific angular positions of the moveable element. For example, as illustrated, higher resistance pulses may correspond to each of rotary positions at angle 1, angle 2 and angle 3. Such operation may be suitable for providing a player a simulated safe cracking exercise where the player turns the moveable element and receives haptic force feedback at specific angular positions.

Figure 5E:
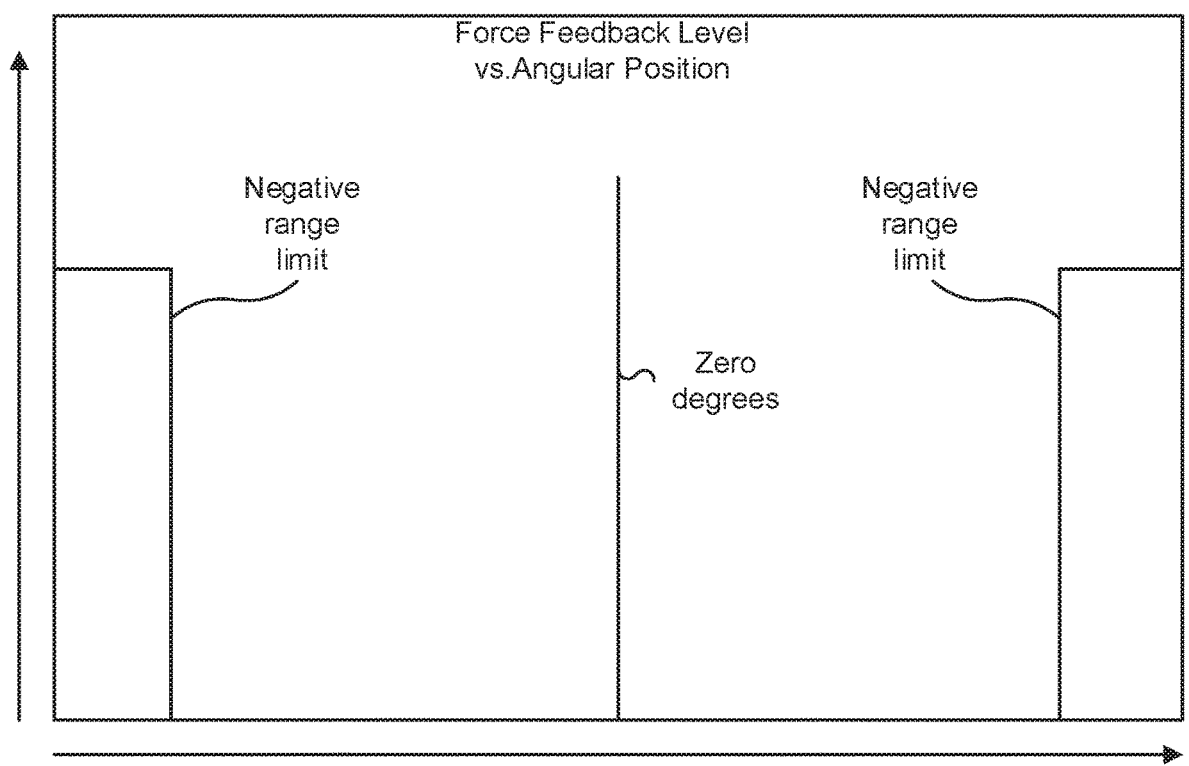

Similarly, referring to FIG. 5E, the force feedback may be provided as a function of the rotary position of the player interface. For example, a first level of resistance that corresponds to an angular operating range of the moveable element may be substantially lower than a second level of resistance that corresponds to the boundaries of the operating range.

While FIGS. 5A-5E each present different variable programmable performance characteristics of the programmable haptic interface individually with respect to one another, embodiments herein provide that any combination of the variable resistance characteristics described may be used in combination with one another.

Figure 6:
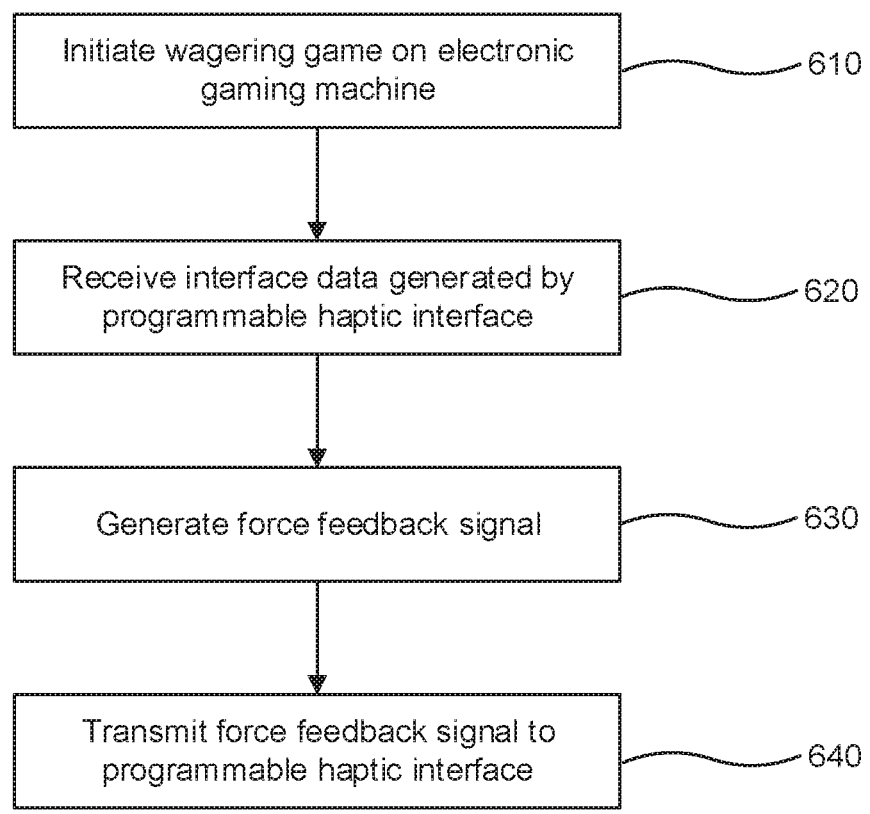
FIG. 6 is a flowchart illustrating operations for methods of providing programmable haptic force feedback sensations according to some embodiments.

Reference is now made to FIG. 6, which is a flowchart illustrating operations for methods of providing programmable haptic force feedback sensations according to some embodiments. Operations may include initiating, by a processor circuit of an electronic gaming machine (EGM), a wagering game on the EGM (block 610). Some embodiments provide that the wagering game operates according to a set of game rules including game flow rules that define a plurality of game events that are presented to a player in a course of operation of the wagering game.

Embodiments may include receiving, into the processor circuit, interface data that is generated by a programmable haptic interface (block 620). Some embodiments provide that the interface data is a measurement of movement of a rotary element in the programmable haptic interface. The processor circuit may generate a force feedback signal that is based on one of the game events and the interface data (block 630). The processor circuit may transmit the force feedback signal to the programmable haptic interface to cause the programmable haptic interface (block 640). Responsive to receiving the force feedback signal, the programmable haptic interface may be caused to generate a variable resistance to movement of the moveable element to a manual activation by the player. In some embodiments, generating the variable resistance may be performed by modulating a magnetic field applied to a magnetorheological fluid in the programmable haptic interface.

In some embodiments, the variable resistance changes based on a position of the movable element. For example, variable resistance changes may generate an elastic spring effect that corresponds to changes in a deformable element that is depicted by the EGM. Some embodiments provide that the programmable haptic interface includes a dynamic pushbutton that includes a linearly movable element that provides a variable resistance to movement based on the force feedback signal. The variable resistance to movement may correspond to one of the game events.

In some embodiments, the programmable haptic interface includes a rotary knob to be manually rotated by the player. The force feedback signal may include left and/or right rotation force feedback that varies corresponding to the game event. In some embodiments, the game event includes a depiction of a rotary operated lock and the force feedback signal is generated to provide a sensation of actuating a dial on the depicted rotary operated lock.

Figure 7A:
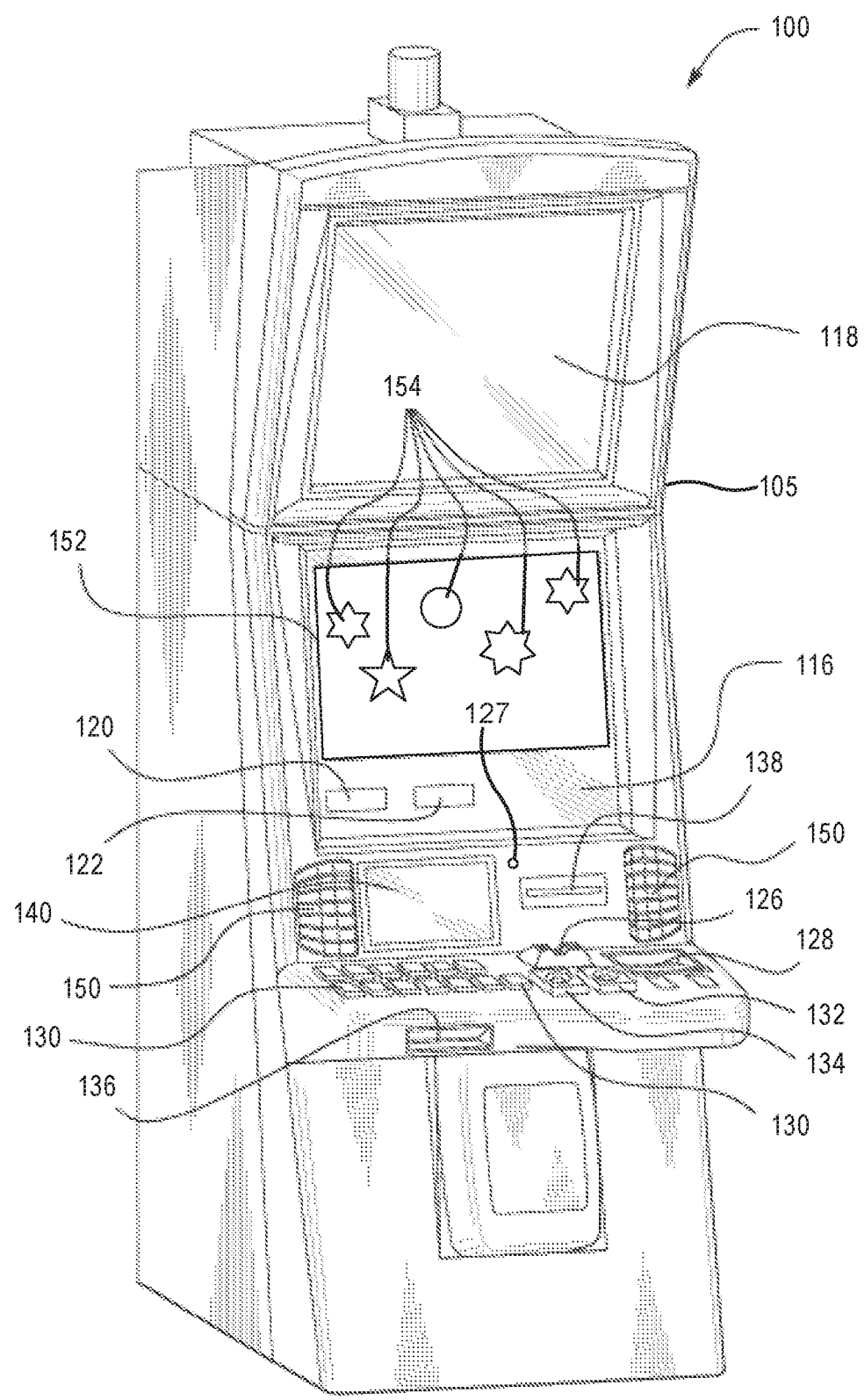
FIGS. 7A to 7E illustrate aspects of electronic game machines according to some embodiments.
Figure 7B:
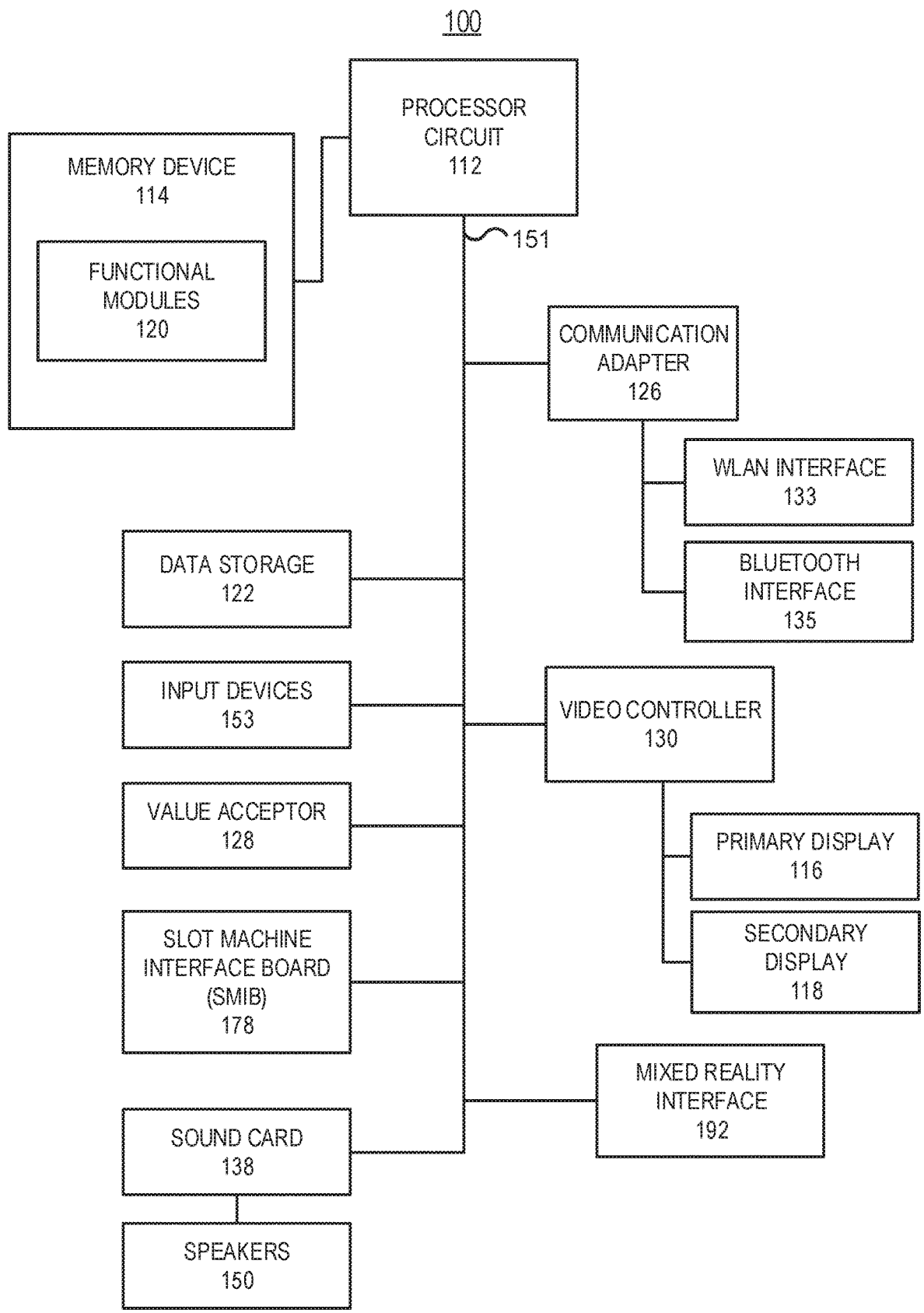
Figure 7C:
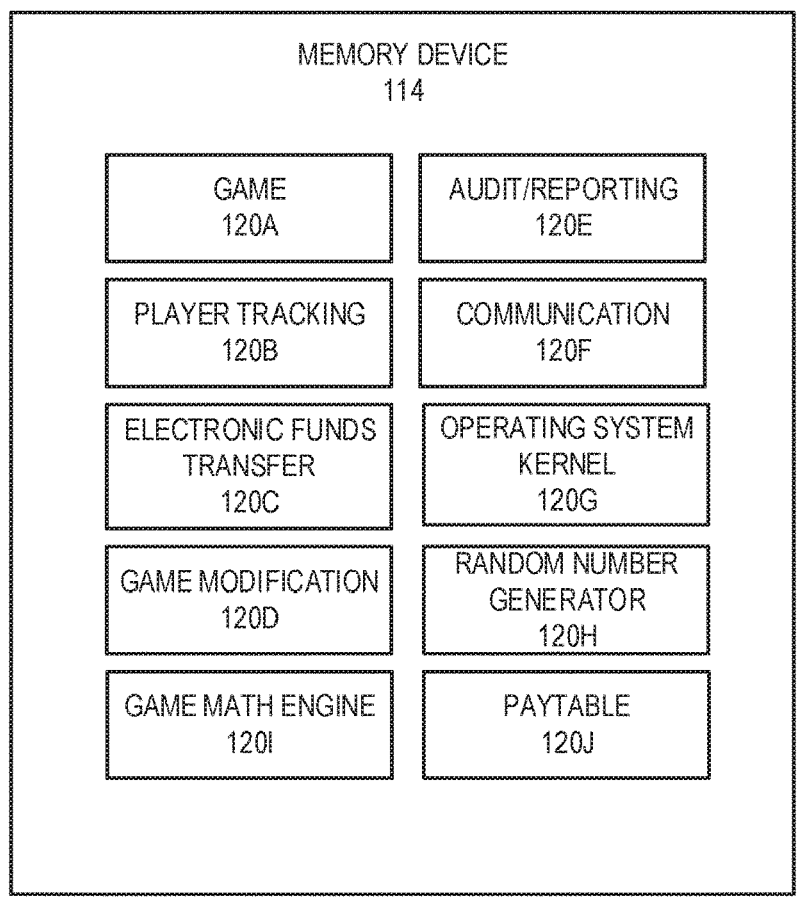

Reference is now made to FIGS. 7A to 7E, which illustrate aspects of electronic game machines according to some embodiments. An example of an electronic gaming machine (EGM) that can include a programmable haptic interface according to various embodiments is illustrated in FIGS. 7A, 7B, and 7C in which FIG. 7A is a perspective view of an EGM 100 illustrating various physical features of the device, FIG. 7B is a functional block diagram that schematically illustrates an electronic relationship of various elements of the EGM 100, and FIG. 7C illustrates various functional modules that can be stored in a memory device of the EGM 100. The embodiments shown in FIGS. 7A to 7C are provided as examples for illustrative purposes only. It will be appreciated that EGMs may come in many different shapes, sizes, layouts, form factors, and configurations, and with varying numbers and types of input and output devices, and that embodiments of the inventive concepts are not limited to the particular EGM structures described herein.

EGMs typically include a number of standard features, many of which are illustrated in FIGS. 7A and 7B. For example, referring to FIG. 7A, an EGM 100 may include a support structure, housing or cabinet 105 which provides support for a plurality of displays, inputs, outputs, controls and other features that enable a player to interact with the EGM 100.

The EGM 100 illustrated in FIG. 7A includes a number of display devices, including a primary display device 116 located in a central portion of the cabinet 105 and a secondary display device 118 located in an upper portion of the cabinet 105. It will be appreciated that one or more of the display devices 116, 118 may be omitted, or that the display devices 116, 118 may be combined into a single display device. The EGM 100 may further include a player tracking display 140, a credit display 120, and a bet display 122. The credit display 120 displays a player's current number of credits, cash, account balance or the equivalent. The bet display 122 displays a player's amount wagered.

The player tracking display 140 may be used to display a service window that allows the player to interact with, for example, their player loyalty account to obtain features, bonuses, comps, etc. In other embodiments, additional display screens may be provided beyond those illustrated in FIG. 7A.

The EGM 100 may further include a number of input devices that allow a player to provide various inputs to the EGM 100, either before, during or after a game has been played. For example, the EGM 100 may include a plurality of input buttons 130 that allow the player to select options before, during or after game play. The EGM may further include a game play initiation button 132 and a cashout button 134. The cashout button 134 is utilized to receive a cash payment or any other suitable form of payment corresponding to a quantity of remaining credits of a credit display.

In some embodiments, one or more input devices of the EGM 100 are one or more game play activation devices that are each used to initiate a play of a game on the EGM 100 or a sequence of events associated with the EGM 100 following appropriate funding of the EGM 100. The example EGM 100 illustrated in FIGS. 7A and 7B includes a game play activation device in the form of a game play initiation button 132. It should be appreciated that, in other embodiments, the EGM 100 begins game play automatically upon appropriate funding rather than upon utilization of the game play activation device.

In some embodiments, one or more input devices of the EGM 100 are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In some embodiments, one or more of the display screens may a touch-sensitive display that includes a digitizer 152 and a touchscreen controller 154 (FIG. 7B). The player may interact with the EGM 100 by touching virtual buttons on one or more of the display devices 116, 118, 140. Accordingly, any of the above described input devices, such as the input buttons 130, the game play initiation button 132 and/or the cashout button 134 may be provided as virtual buttons on one or more of the display devices 116, 118, 140.

Referring briefly to FIG. 7B, operation of the primary display device 116, the secondary display device 118 and the player tracking display 140 may be controlled by a video controller 130 that receives video data from a processor circuit 112 or directly from a memory device 114 and displays the video data on the display screen. The credit display 120 and the bet display 122 are typically implemented as simple LCD or LED displays that display a number of credits available for wagering and a number of credits being wagered on a particular game. Accordingly, the credit display 120 and the bet display 122 may be driven directly by the processor circuit 112. In some embodiments however, the credit display 120 and/or the bet display 122 may be driven by the video controller 30.

Referring again to FIG. 7A, the display devices 116, 118, 140 may include, without limitation: a cathode ray tube, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touch-screen with an associated touch-screen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 130 of the EGM 100 are generally configured to display one or more game and/or non-game images, symbols, and indicia. In certain embodiments, the display devices 116, 118, 140 of the EGM 100 are configured to display any suitable visual representation or exhibition of the movement of objects; dynamic lighting; video images; images of people, characters, places, things, and faces of cards; and the like. In certain embodiments, the display devices 116, 118, 140 of the EGM 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The EGM 100 also includes various features that enable a player to deposit credits in the EGM 100 and withdraw credits from the EGM 100, such as in the form of a payout of winnings, credits, etc. For example, the EGM 100 may include a ticket dispenser 136, a bill/ticket acceptor 128, and a coin acceptor 126 that allows the player to deposit coins into the EGM 100.

While not illustrated in FIG. 7A, the EGM 100 may also include a note dispenser configured to dispense paper currency and/or a coin generator configured to dispense coins or tokens in a coin payout tray.

The EGM 100 may further include one or more speakers 150 controlled by one or more sound cards 138 (FIG. 7B). The EGM 100 illustrated in FIG. 7A includes a pair of speakers 150. In other embodiments, additional speakers, such as surround sound speakers, may be provided within or on the cabinet 105. Moreover, the EGM 100 may include built-in seating with integrated headrest speakers.

In various embodiments, the EGM 100 may generate dynamic sounds coupled with attractive multimedia images displayed on one or more of the display devices 116, 118, 140 to provide an audio-visual representation or to otherwise display full-motion video with sound to attract players to the EGM 100 and/or to engage the player during gameplay. In certain embodiments, the EGM 100 may display a sequence of audio and/or visual attraction messages during idle periods to attract potential players to the EGM 100. The videos may be customized to provide any appropriate information.

The EGM 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processor circuit determines the amount of funds entered and displays the corresponding amount on the credit or other suitable display as described above.

In some embodiments, the EGM 100 may include an electronic payout device or module configured to fund an electronically recordable identification card or smart card or a bank or other account via an electronic funds transfer to or from the EGM 100.

FIG. 7B is a block diagram that illustrates logical and functional relationships between various components of an EGM 100. As shown in FIG. 7B, the EGM 100 may include a processor circuit 112 that controls operations of the EGM 100. Although illustrated as a single processor circuit, multiple special purpose and/or general purpose processor circuits and/or processor circuit cores may be provided in the EGM 100. For example, the EGM 100 may include one or more of a video processor, a signal processor, a sound processor and/or a communication controller that performs one or more control functions within the EGM 100. The processor circuit 112 may be variously referred to as a "controller," "microcontroller," "microprocessor" or simply a "computer." The processor circuit may further include one or more application-specific integrated circuits (ASICs).

Various components of the EGM 100 are illustrated in FIG. 7B as being connected to the processor circuit 112. It will be appreciated that the components may be connected to the processor circuit 112 through a system bus, a communication bus and controller, such as a USB controller and USB bus, a network interface, or any other suitable type of connection.

The EGM 100 further includes a memory device 114 that stores one or more functional modules 120. Various functional modules 120 of the EGM 100 will be described in more detail below in connection with FIG. 7D.

The memory device 114 may store program code and instructions, executable by the processor circuit 112, to control the EGM 100. The memory device 114 may also store other data such as image data, event data, player input data, random or pseudo-random number generators, paytable data or information and applicable game rules that relate to the play of the gaming device. The memory device 114 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 114 may include flash memory and/or EEPROM (electrically erasable programmable read only memory). Any other suitable magnetic, optical and/or semiconductor memory may operate in conjunction with the gaming device disclosed herein.

The EGM 100 may further include a data storage device 122, such as a hard disk drive or flash memory. The data storage 122 may store program data, player data, audit trail data or any other type of data. The data storage 122 may include a detachable or removable memory device, including, but not limited to, a suitable cartridge, disk, CD ROM, DVD or USB memory device.

The EGM 100 may include a communication adapter 26 including transceiver circuitry that enables the EGM 100 to communicate with remote devices over a wired and/or wireless communication network, such as a local area network (LAN), wide area network (WAN), cellular communication network, or other data communication network. The communication adapter 126 may further include transceiver circuitry for supporting short range wireless communication protocols, such as Bluetooth and/or near field communications (NFC) that enable the EGM 100 to communicate, for example, with a mobile communication device operated by a player.

The EGM 100 may include one or more internal or external communication ports that enable the processor circuit 112 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processor circuit through a universal serial bus (USB) hub (not shown) connected to the processor circuit 112.

In some embodiments, the EGM 100 may include a sensor, such as a camera in communication with the processor circuit 112 (and possibly controlled by the processor circuit 112) that is selectively positioned to acquire an image of a player actively using the EGM 100 and/or the surrounding area of the EGM 100. In one embodiment, the camera may be configured to selectively acquire still or moving (e.g., video) images and may be configured to acquire the images in either an analog, digital or other suitable format. The display devices 116, 118, 140 may be configured to display the image acquired by the camera as well as display the visible manifestation of the game in split screen or picture-in-picture fashion. For example, the camera may acquire an image of the player and the processor circuit 112 may incorporate that image into the primary and/or secondary game as a game image, symbol or indicia.

Various functional modules of that may be stored in a memory device 114 of an EGM 100 are illustrated in FIG. 7C. Referring to FIG. 7C, the EGM 100 may include in the memory device 114 a game module 120A that includes program instructions and/or data for operating a hybrid wagering game as described herein. The EGM 100 may further include a player tracking module 120B, an electronic funds transfer module 120C, a game modification module 120D, an audit/reporting module 120E, a communication module 120F, an operating system 120G, a random number generator 120H, a game math engine 1201 and a paytable 120J. The player tracking module 120B keeps track of the play of a player. The electronic funds transfer module 120C communicates with a back end server or financial institution to transfer funds to and from an account associated with the player. The game modification module 20D adjusts game play based on identified player preferences as described in more detail herein. The communication module 120F enables the EGM 100 to communicate with remote servers and other EGMs using various secure communication interfaces. The operating system kernel 120G controls the overall operation of the EGM 100, including the loading and operation of other modules. The random number generator 120H generates random or pseudorandom numbers for use in the operation of the hybrid games described herein. The game math engine 1201 defines probabilities of pseudorandom events that can occur in the course of operation of the wagering game based on pseudorandom numbers generated by the random number generator 120H. The paytable 120J defines winning events that can occur in the course of operation of the wagering game.

In some embodiments, an EGM 100 may be implemented by a desktop computer, a laptop personal computer, a personal digital assistant (PDA), portable computing device, or other computerized platform. In some embodiments, the EGM 100 may be operable over a wireless network, such as part of a wireless gaming system. In such embodiments, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 7D:
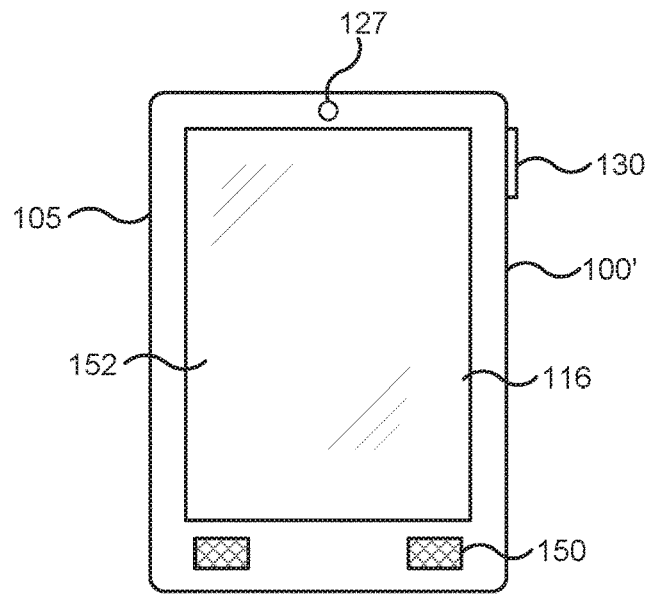

For example, referring to FIG. 7D, an EGM 100' may be implemented as a handheld device including a compact housing 105 on which is mounted a touchscreen display device 116 including a digitizer 152. An input button 130 may be provided on the housing and may act as a power or control button. A camera 127 may be provided in a front face of the housing 105. The housing 105 may include one or more speakers 150. In the EGM 100', various input buttons described above, such as the cashout button, gameplay activation button, etc., may be implemented as soft buttons on the touchscreen display device 116. Moreover, the EGM 100' may omit certain features, such as a bill acceptor, a ticket generator, a coin acceptor or dispenser, a card reader, secondary displays, a bet display, a credit display, etc. Credits can be deposited in or transferred from the EGM 100' electronically.

Figure 7E:
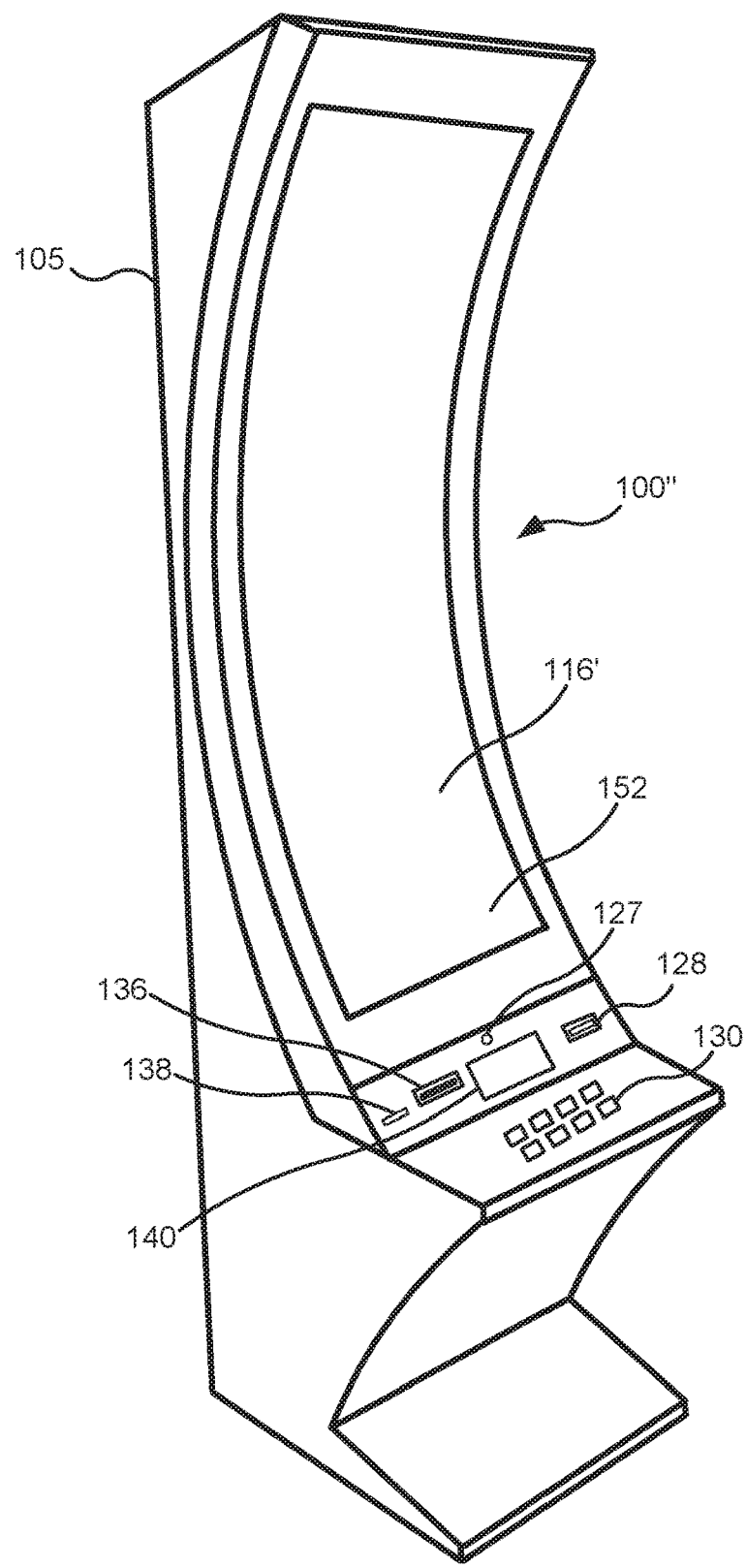

FIG. 7E illustrates a standalone EGM 100" having a different form factor from the EGM 100 illustrated in FIG. 7A. In particular, the EGM 100" is characterized by having a large, high aspect ratio, curved primary display device 116' provided in the housing 105, with no secondary display device. The primary display device 116' may include a digitizer 152 to allow touchscreen interaction with the primary display device 116'. The EGM 100" may further include a player tracking display 140, a plurality of input buttons 130, a bill/ticket acceptor 128, a card reader 138, and a ticket generator 136. The EGM 100" may further include one or more cameras 127 to enable facial recognition and/or motion tracking.

Example Use Cases

In some embodiments, the programmable haptic interface may be used to simulate a threshold and/or a limitation. For example, a threshold may be provided responsive to a player making a selection of notable player attention. In such embodiments, an increased resistance to movement may be provided to overcome such threshold. In some embodiments, increasing and/or decreasing game parameters, such as volume, game speed, reel spin speed, rumble intensity, betting amounts, betting lines, and betting denominations may correspond to different levels of resistance.

Some embodiments provide that the resistance may be varied to indicate game volatility. For example, the resistive feedback may be increased corresponding to increased tension and/or risk to be expected from a given selection. Further, a game selector may correspond to different materials (e.g., a burning fire, flowing water, sandstorm) that may correspond to different resistive feedback sensations. Some embodiments provide that a tutorial like danger indicator may be implemented by providing higher resistance corresponding to bad decisions in the game.

In some embodiments, a programmable haptic interface may be self-rotating. A player may hold the moveable element still to activate and/or maintain an auto play mode. In such embodiments, responsible gaming may be encouraged by stopping the auto play mode is the moveable element is released or if the resistance exceeds an upper threshold.

Some embodiments provide the programmable haptic interface may be used to allow a player to navigate through menus, including those that may allow a used to adjust game settings.

In some embodiments, the programmable haptic interface may be implemented to perform as a game style joystick. In such embodiments, the programmable haptic interface may be used to increase and/or decrease spin time and/or to stop or start a reel spin. For example, in a reaction game, a player may receive a different resistance corresponding to particular symbol passing by during the spin to allow the player to try to stop the spinning reel at a particular symbol. In some embodiments, the programmable haptic interface may change the resistance to provide a nudge of a reel that may be selected by the programmable haptic interface. Feedback may be provided that confirms a successful nudge.

Some embodiments provide that the programmable haptic interface may be used to provide a fast reel stop and include resistance that corresponds to a brake. In some embodiments, the programmable haptic interface may provide a feedback corresponding to a spinning wheel selector being passed, including while the player is spinning the wheel.

In an aquatic game environment, a player may try to adjust the size of bubbles that appear by rotating a knob of the programmable haptic interface. The rotary control of an object may be controlled and/or adjusted using the programmable haptic interface.

In some embodiments, a player may try to balance a scale using the programmable haptic interface in which the force feedback is changed when objects drop onto different sides of the scale.

Some embodiments provide that the programmable haptic interface allows a player to receive feedback corresponding to a game object that is not displayed, such as because the game environment is a dark room or a player's avatar is blindfolded.

In some embodiments, the programmable haptic interface may simulate pulling a spring in which the player tries to stretch a spring as far as possible without breaking it. The force feedback may provide a sensation to guide the player regarding the limit of the stretching. In some embodiments, elastic based operations, such as shooting an object using a slingshot may be enhanced by varying the resistance based on how far the spring is stretched.

Some embodiments provide that the programmable haptic interface may provide a vibration or other sensation in response to game object touching. For example, a breakout game may be provided in which the resistance defines the side limits of movement of the bar and a vibration responsive to the ball touching the bar. Some embodiments provide that the further the game progresses, the more random the resistance changes become.

In some embodiments, two programmable haptic interfaces may be used to provide coordinated movement through a game environment. For example, one programmable haptic interface may correspond to left-right (e.g., horizontal axis) movement and the other programmable haptic interface may correspond to forward-rearward (e.g., vertical axis) movement.

In some embodiments, the programmable haptic interfaces correspond to left and right flippers in a virtual pinball game.

Some embodiments provide that the programmable haptic interfaces may be used in a coordinated manner in which the player may try to match the positioning of the first programmable haptic interfaces even though they may provide different resistance patterns.

Some embodiments provide that the programmable haptic interface may be further configured to operate in conjunction with other data, such as biometric data, to provide a force feedback that is coordinated with the player's experience.

Some embodiments provide that the programmable haptic interface may be used in combination with inputs received via a touch screen. Examples include driving a fire truck using the programmable haptic interface while spraying a firehouse based on inputs received via the touch screen. Additionally, game settings may be selected on the touch screen and adjusted using the programmable haptic interface. Different settings values may correspond to different resistance levels based on properties such as difficulty.

Some embodiments provide the programmable haptic interface may be implemented as a single axis controller, including as a lever for a stepper and/or as a foot-operated pedal. Resistance may be varied randomly and/or based on a bet amount, a credit amount, number of reels to be spun, desired reel speed, individual reel spins based on incremental position of the lever, a fast reel stop input, and a reel braking sensation, among others. The resistance may further provide a ratcheting type lever operation in which the lever may only be moved in a single direction until a given range of motion is achieved, after which the lever may be returned to an original position.

In some embodiments, additional data corresponding to a player may be used to adjust resistance levels and/or ranges of motion of the programmable haptic interface. For example, resistance levels and/or a range of motion may be varied based on age, gender, and/or size. In some embodiments, less mobile players may desire a reduced range of motion relative to other players.

Additional Features and Embodiments

The above-described embodiments of the present inventive concepts can be implemented in any of numerous ways. For example, the embodiments may be implemented using hardware, software or a suitable combination thereof. When implemented in software, the software code can be executed on any suitable processor or collection of processors, whether provided in a single computer or distributed among multiple computers. Such processors may be implemented as integrated circuits, with one or more processors in an integrated circuit component. Further, a processor may be implemented using circuitry in any suitable format.

It should be appreciated that a computer may be embodied in any of a number of forms, such as a rack-mounted computer, a desktop computer, a laptop computer, or a tablet computer. Additionally, a computer may be embedded in a device perhaps not generally regarded as a computer but with suitable processing capabilities, including an electronic gaming machine, a Web TV, a Personal Digital Assistant (PDA), a smart phone or any other suitable portable or fixed electronic device.

Also, a computer may have one or more input and output devices. These devices can be used, among other things, to present a player interface. Examples of output devices that can be used to provide a player interface include printers or display screens for visual presentation of output and speakers or other sound generating devices for audible presentation of output. Examples of input devices that can be used for a player interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks. As used herein, the term "online" refers to such networked systems, including computers networked using, e.g., dedicated lines, telephone lines, cable or ISDN lines as well as wireless transmissions. Online systems include remote computers using, e.g., a local area network (LAN), a wide area network (WAN), the Internet, as well as various combinations of the foregoing. Suitable player devices may connect to a network for instance, any computing device that is capable of communicating over a network, such as a desktop, laptop or notebook computer, a mobile station or terminal, an entertainment appliance, a set-top box in communication with a display device, a wireless device such as a phone or smartphone, a game console, etc. The term "online gaming" refers to those systems and methods that make use of such a network to allow a game player to make use of and engage in gaming activity through networked, or online systems, both remote and local. For instance, "online gaming" includes gaming activity that is made available through a website on the Internet.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the inventive concepts may be embodied as a tangible, non-transitory computer readable storage medium (or multiple computer readable storage media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage media) encoded with one or more programs that, when executed on one or more computers or other processors, perform methods that implement the various embodiments of the inventive concepts discussed above. The computer readable medium or media can be transportable, such that the program or programs stored thereon can be loaded onto one or more different computers or other processors to implement various aspects of the present inventive concepts as discussed above. As used herein, the term "non-transitory computer-readable storage medium" encompasses only a computer-readable medium that can be considered to be a manufacture (i.e., article of manufacture) or a machine and excludes transitory signals.

The terms "program" or "software" are used herein in a generic sense to refer to any type of computer code or set of computer-executable instructions that can be employed to program a computer or other processor to implement various aspects of the present inventive concepts as discussed above. Additionally, it should be appreciated that according to one aspect of this embodiment, one or more computer programs that when executed perform methods of the present inventive concepts need not reside on a single computer or processor, but may be distributed in a modular fashion amongst a number of different computers or processors to implement various aspects of the present inventive concepts.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags, addresses or other mechanisms that establish relationship between data elements.

Various aspects of the present inventive concepts may be used alone, in combination, or in a variety of arrangements not specifically discussed in the embodiments described in the foregoing and the concepts described herein are therefore not limited in their application to the details and arrangement of components set forth in the foregoing description or illustrated in the drawings. For example, aspects described in one embodiment may be combined in any manner with aspects described in other embodiments.

Also, the inventive concepts may be embodied as a method, of which several examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While the inventive concepts have been described with reference to certain example embodiments thereof, those skilled in the art may make various modifications to the described embodiments of the inventive concepts without departing from the true spirit and scope of the inventive concepts. The terms and descriptions used herein are set forth by way of illustration only and not meant as limitations. In particular, although the present inventive concepts have been described by way of examples, a variety of devices would practice the inventive concepts described herein. Although the inventive concepts have been described and disclosed in various terms and certain embodiments, the scope of the inventive concepts is not intended to be, nor should it be deemed to be, limited thereby and such other modifications or embodiments as may be suggested by the teachings herein are particularly reserved, especially as they fall within the breadth and scope of the claims here appended. Those skilled in the art will recognize that these and other variations are possible within the spirit and scope of the inventive concepts as defined in the following claims and their equivalents.

What is claimed is:

1. An electronic gaming machine (EGM) comprising:
a programmable haptic interface that produces, responsive to a force feedback signal, a variable amount of resistance to movement of a moveable element of the programmable haptic interface by a player as a haptic force feedback, wherein the programmable haptic interface controls a game function of a plurality of game functions;
a touch interface to receive touch inputs from the player, wherein the touch inputs determine which of the plurality of game functions is associated with the programmable haptic interface;
a processor circuit; and
a memory coupled to the processor circuit, the memory comprising machine-readable instructions that, when executed by the processor circuit cause the processor circuit to:
initiate a wagering game on the EGM, wherein the wagering game operates according to a set of game rules comprising game flow rules that define a sequence of game events that are presented to the player in a course of operation of the wagering game; and
generate the force feedback signal controlling an amount of resistance to movement of the moveable element of the programmable haptic interface based on a game event in the sequence of game events,
wherein the programmable haptic interface comprises:
a magnetorheological fluid coupling the moveable element to a fixed housing that is mounted to the EGM; and
a circuit controlling a magnitude of a magnetic field that is applied across the magnetorheological fluid responsive to the force feedback signal.

2. The EGM of claim 1, wherein the programmable haptic interface further comprises a movable element encoder that measures movement responsive to manual activation of the moveable element and generates interface movement data that is used by the processor circuit to generate the force feedback signal.

3. The EGM of claim 1, wherein the programmable haptic interface comprises a rotary knob,
wherein the force feedback signal is generated based on the game event and a measurement of a rotary position of the rotary knob.

4. The EGM of claim 3, wherein the force feedback signal is generated to control an amount of resistance to movement of the rotary knob based on a combination of the game event and an amount of change in rotary position of the rotary knob.

5. The EGM of claim 1, wherein the programmable haptic interface comprises a vehicle steering wheel, and
wherein the haptic force feedback is generated to provide a varying amount of resistance to rotation of the vehicle steering wheel based on which of the sequence of game events is presently presented to the player in the course of operation of the wagering game.

6. The EGM of claim 1, wherein the programmable haptic interface comprises a vehicle steering wheel, and
wherein the haptic force feedback comprises a periodic haptic force feedback that is generated to alternate between providing a first amount of resistance to movement of the vehicle steering wheel and a second amount of resistance to movement of the vehicle steering wheel at a first frequency that corresponds to the game event.

7. The EGM of claim 1, wherein the programmable haptic interface comprises a rotary knob to be manually rotated by the player,
wherein the rotary knob is self-rotating, and
wherein the wagering game operates in an auto-play mode responsive to the player holding the rotary knob in a fixed position for a threshold time.

8. The EGM of claim 7,
wherein the resistance is in a resistance range that comprises negative resistance and positive resistance,
wherein the negative resistance comprises negative resistance in a first direction, and
wherein the force feedback signal is controlled to provide an increasing amount of resistance to movement of the rotary knob responsive to the player holding the rotary knob in a static position for an increasing time duration.

9. The EGM of claim 8, wherein the force feedback signal is generated based on a rotational direction measurement indicating a direction of rotation of the rotary knob and a rotational velocity measurement indicating a rotational velocity of the rotary knob.

10. The EGM of claim 8, further comprising an electric motor that is mechanically engaged with a shaft of the rotary knob and, responsive to receiving a voltage, causes movement of the rotary knob to act against the resistance to rotation caused by the magnetorheological fluid, and
wherein the force feedback signal is controlled to modulate resistance to movement of the rotary knob that is caused by the electric motor.

11. The EGM of claim 1, further comprising a single axis controller that comprises:
the programmable haptic interface; and a lever that extends from the programmable haptic interface and that comprises a rotational motion range about a center of rotation that corresponds to the programmable haptic interface,
wherein the single axis controller determines the player input corresponding to linear motion,
wherein the force feedback signal controls the amount of resistance that is delivered to the player via the lever.

12. The EGM of claim 1, further comprising a single axis controller that comprises:
the programmable haptic interface; and
a lever that extends from the programmable haptic interface and that comprises a rotational motion range about a center of rotation that corresponds to the programmable haptic interface,
wherein the single axis controller determines the player input corresponding to linear motion,
wherein the force feedback signal controls the amount of resistance that is delivered to the player via the lever,
wherein the processor circuit causes a reel speed corresponding to a displayed reel of the EGM to be varied based on the movement of the single axis controller, and
wherein the resistance increases responsive to the player moving the single axis controller.

13. The EGM of claim 1, further comprising a multi-axis controller that comprises the programmable haptic interface and that receives player input corresponding to a plurality of axes of movement of a joystick,
wherein the processor circuit generates the force feedback signal for the multiple axes of movement and sends the force feedback signal to the programmable haptic interface,
wherein the haptic force feedback comprises a variable resistance that is delivered to the player through the joystick, and
wherein the variable resistance changes in directions corresponding to the plurality of axes of movement responsive to a change in a property of the wagering game.

14. The EGM of claim 1, wherein the variable resistance to movement comprises a first level of resistance that corresponds to an operating range of the programmable haptic interface and a second level of resistance that is greater than the first level of resistance and that corresponds to boundaries that define the operating range of the programmable haptic interface.

15. A method, comprising:
initiating, by a processor circuit of an electronic gaming machine (EGM), a wagering game on the EGM, wherein the wagering game operates according to a set of game rules comprising game flow rules that define a plurality of game events that are presented to a player in a course of operation of the wagering game;
receiving, into the processor circuit, interface data that is generated by a programmable haptic interface and that is a measurement of movement of a movable element in the programmable haptic interface;
generating, by the processor circuit, a force feedback signal that is based on one of the plurality of game events and the interface data; and
transmitting, by the processor circuit, the force feedback signal to the programmable haptic interface to cause the programmable haptic interface to generate a variable resistance to movement of the movable element to a manual activation by the player by modulating a magnetic field applied to a magnetorheological fluid in the programmable haptic interface, wherein the variable resistance changes based on a position of the movable element, and wherein the variable resistance changes generate an elastic spring effect that corresponds to changes in a deformable element that is depicted by the EGM.

16. The method of claim 15, wherein the programmable haptic interface comprises a dynamic pushbutton that comprises a linearly movable element that comprises a variable resistance to movement based on the force feedback signal, wherein the variable resistance to movement corresponds to one of the plurality of game events.

17. A method, comprising:
initiating, by a processor circuit of an electronic gaming machine (EGM), a wagering game on the EGM, wherein the wagering game operates according to a set of game rules comprising game flow rules that define a plurality of game events that are presented to a player in a course of operation of the wagering game;
receiving, into the processor circuit, interface data that is generated by a programmable haptic interface and that is a measurement of movement of a rotary element in the programmable haptic interface, wherein the programmable haptic interface comprises a rotary knob to be manually rotated by the player;
generating, by the processor circuit, a force feedback signal that is based on one of the plurality of game events and the interface data, wherein the force feedback signal comprises a left/right rotation force feedback that varies corresponding to the game event, wherein the game event comprises a depiction of a rotary operated lock and the force feedback signal is generated to provide a sensation of actuating a dial on the rotary operated lock; and
transmitting, by the processor circuit, the force feedback signal to the programmable haptic interface to cause the programmable haptic interface to generate a variable resistance to movement of the moveable element to a manual activation by the player by modulating a magnetic field applied to a magnetorheological fluid in the programmable haptic interface.

\* \* \* \* \*